(12) United States Patent
Reischl et al.

(10) Patent No.: US 12,264,019 B2
(45) Date of Patent: Apr. 1, 2025

(54) CONVEYED-GOODS CONTAINER FOR AN OVERHEAD CONVEYOR, AND UNLOADING STATION FOR UNLOADING SAME

(71) Applicant: TGW Mechanics GmbH, Wels (AT)

(72) Inventors: Josef Reischl, Gunskirchen (AT); Martin Rausch, Gmunden (AT)

(73) Assignee: TGW Mechanics GmbH, Wels (AT)

( * ) Notice: Subject to any disclaimer, the term of this patent is extended or adjusted under 35 U.S.C. 154(b) by 828 days.

(21) Appl. No.: 17/423,241

(22) PCT Filed: Jan. 23, 2020

(86) PCT No.: PCT/AT2020/060021
§ 371 (c)(1),
(2) Date: Jul. 15, 2021

(87) PCT Pub. No.: WO2020/150762
PCT Pub. Date: Jul. 30, 2020

(65) Prior Publication Data
US 2022/0063917 A1    Mar. 3, 2022

(30) Foreign Application Priority Data
Jan. 25, 2019   (AT) .............................. A 50059/2019

(51) Int. Cl.
*B65G 47/61* (2006.01)
*B65G 9/00* (2006.01)
(Continued)

(52) U.S. Cl.
CPC ............. *B65G 47/61* (2013.01); *B65G 9/002* (2013.01); *B65G 9/004* (2013.01); *B65G 19/025* (2013.01);
(Continued)

(58) Field of Classification Search
CPC .............................. B65G 9/002; B65G 9/004; B65G 2201/0238; B65G 19/025; B65G 47/61;
(Continued)

(56) References Cited

U.S. PATENT DOCUMENTS 4,140,163 A * 2/1979 Usner ....................... A47F 7/19
383/92
8,607,963 B2   12/2013 Wend et al.
(Continued)

FOREIGN PATENT DOCUMENTS

AT        520 517 A4      5/2019
CN       104619615 A      5/2015
(Continued)

OTHER PUBLICATIONS

International Search Report in PCT/AT2020/060021, mailed May 11, 2020.
(Continued)

*Primary Examiner* — Zachary L Kuhfuss
(74) *Attorney, Agent, or Firm* — Collard & Roe, P.C.

(57) ABSTRACT

An article container for an overhead conveying device for transporting an article includes a bag body adjustable between a transport position and a loading and/or unloading position. The body includes front and rear walls of flexible material, a loading and/or unloading opening on a first body side at least in regions between the front and rear walls, a side wall stop against which the article is placeable formed on a second body side at least in some regions between the front and rear walls. The front wall forms first and second front wall sections and includes a base plate in the first front wall section. The rear wall includes first and second rear wall sections. The first rear wall section forms a transport rest sloping in the side wall stop direction when the bag body is (Continued)

in the transport position. Moreover, an unloading station automatically unloads an article container.

28 Claims, 18 Drawing Sheets

(51) Int. Cl.
*B65G 19/02* (2006.01)
*B65G 35/06* (2006.01)

(52) U.S. Cl.
CPC ...... *B65G 35/06* (2013.01); *B65G 2201/0238* (2013.01)

(58) Field of Classification Search
CPC ...... B65G 47/38; B65G 17/485; B65D 33/14; B65D 29/00
See application file for complete search history.

(56) References Cited

U.S. PATENT DOCUMENTS

| | | | |
|---|---|---|---|
| 9,511,940 | B2 | 12/2016 | Schönenberger |
| 9,630,751 | B1* | 4/2017 | Otto ............... B65G 17/20 |
| 10,005,616 | B2 | 6/2018 | Fenile et al. |
| 10,040,641 | B2 | 8/2018 | Fenile et al. |
| 10,301,114 | B2 | 5/2019 | Fenile |
| 10,322,887 | B2 | 6/2019 | Fenile |
| 10,336,548 | B2 | 7/2019 | Fenile et al. |
| 10,370,179 | B2* | 8/2019 | Schneuing ......... B65G 17/20 |
| 10,494,196 | B2 | 12/2019 | Fenile |
| 10,647,523 | B2* | 5/2020 | Sigrist ............... B65G 9/004 |
| 11,072,466 | B2* | 7/2021 | Wend ............. B65D 33/1658 |
| 11,299,350 | B2* | 4/2022 | Fenile ............... B65G 9/004 |
| 11,352,216 | B2* | 6/2022 | Reischl ............ B65G 19/025 |
| 11,866,254 | B2* | 1/2024 | Reischl ............... B65G 17/32 |
| 2012/0037272 | A1* | 2/2012 | Wend ............... B65G 19/025 141/250 |
| 2012/0152697 | A1* | 6/2012 | Janzen ............... B65G 17/32 198/680 |
| 2012/0216917 | A1* | 8/2012 | Janzen ............. B65G 19/025 141/166 |
| 2016/0159558 | A1* | 6/2016 | Schneuing ........... B65D 33/02 206/282 |
| 2017/0088302 | A1* | 3/2017 | Auf Der Maur ...... B65G 9/004 |
| 2018/0072511 | A1* | 3/2018 | Fenile ............... B65G 9/004 |
| 2018/0086563 | A1* | 3/2018 | Janzen .............. B65G 19/025 |
| 2020/0024074 | A1 | 1/2020 | Herzog-Lang et al. |
| 2021/0155415 | A1 | 5/2021 | Reischl et al. |

FOREIGN PATENT DOCUMENTS

| | | |
|---|---|---|
| CN | 107406198 A | 11/2017 |
| DE | 10 2004 018569 A1 | 11/2005 |
| DE | 10 2011 080 280 A1 | 2/2013 |
| DE | 20 2017 106 993 U1 | 12/2017 |
| EP | 2 130 968 A1 | 12/2009 |
| EP | 2 196 415 A2 | 6/2010 |
| EP | 2 418 160 A1 | 2/2012 |
| EP | 3 293 130 A1 | 3/2018 |
| EP | 2 885 231 B1 | 11/2019 |
| WO | 2014/044601 A1 | 3/2014 |
| WO | 2016/120031 A1 | 8/2016 |
| WO | 2018/130712 A2 | 7/2018 |
| WO | 2019/195871 A1 | 10/2019 |

OTHER PUBLICATIONS

Chinese Search Report dated Jul. 7, 2022 in Chinese Application No. 2020800107017 (in Chinese).

* cited by examiner

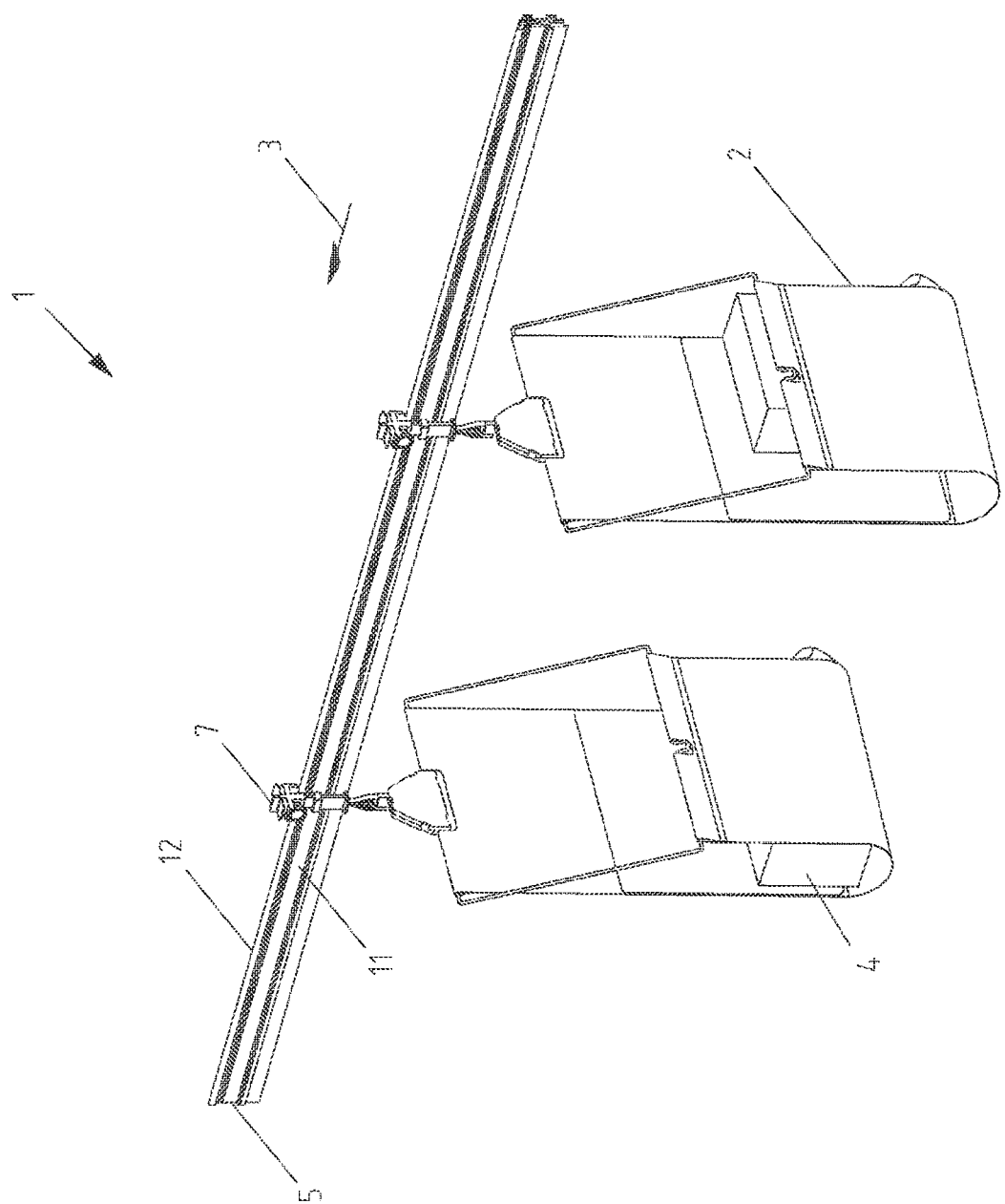

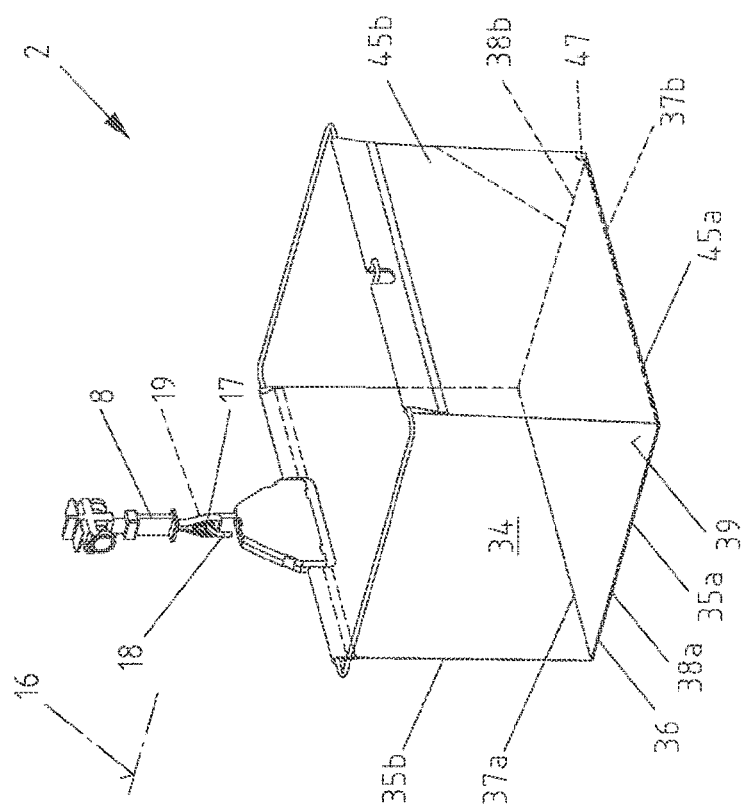
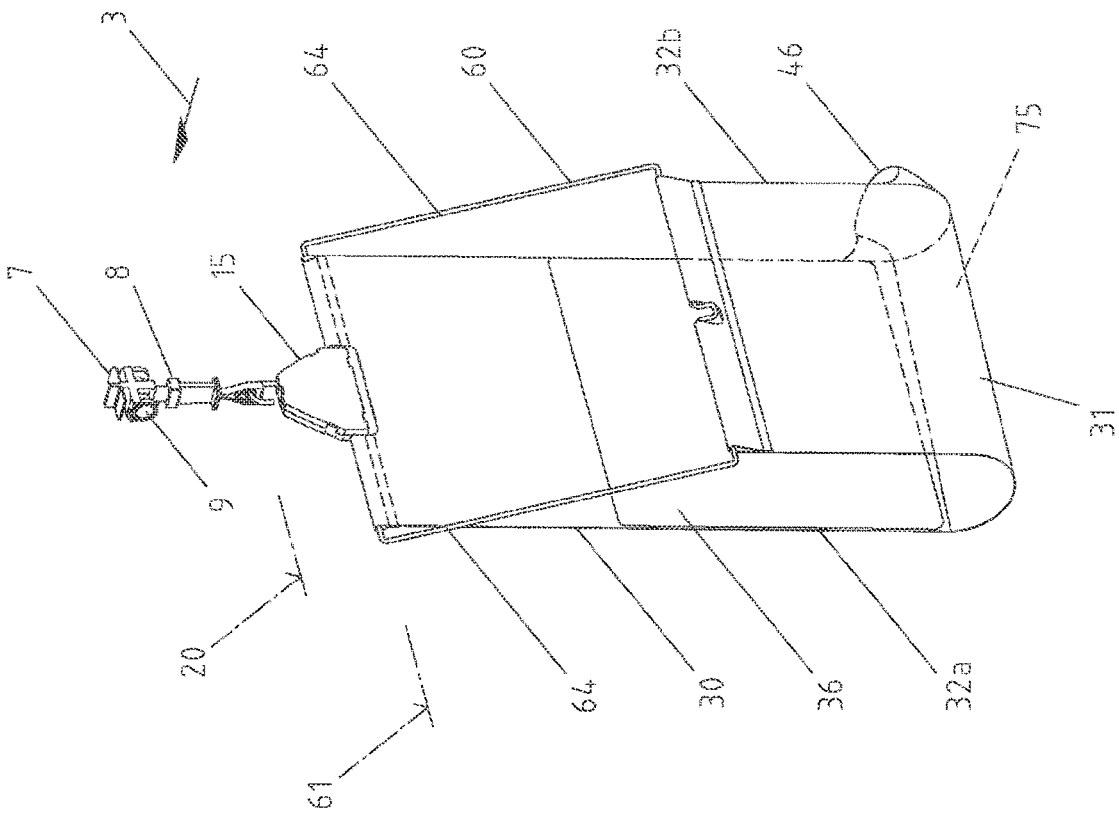

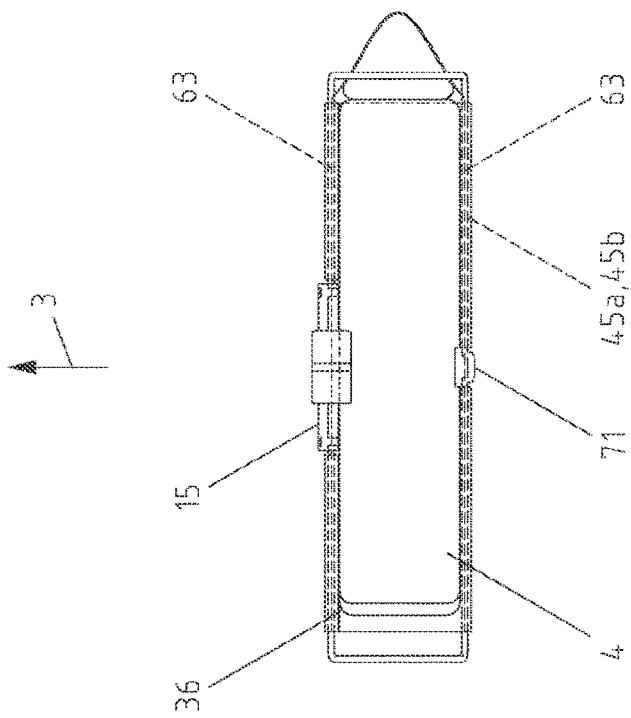
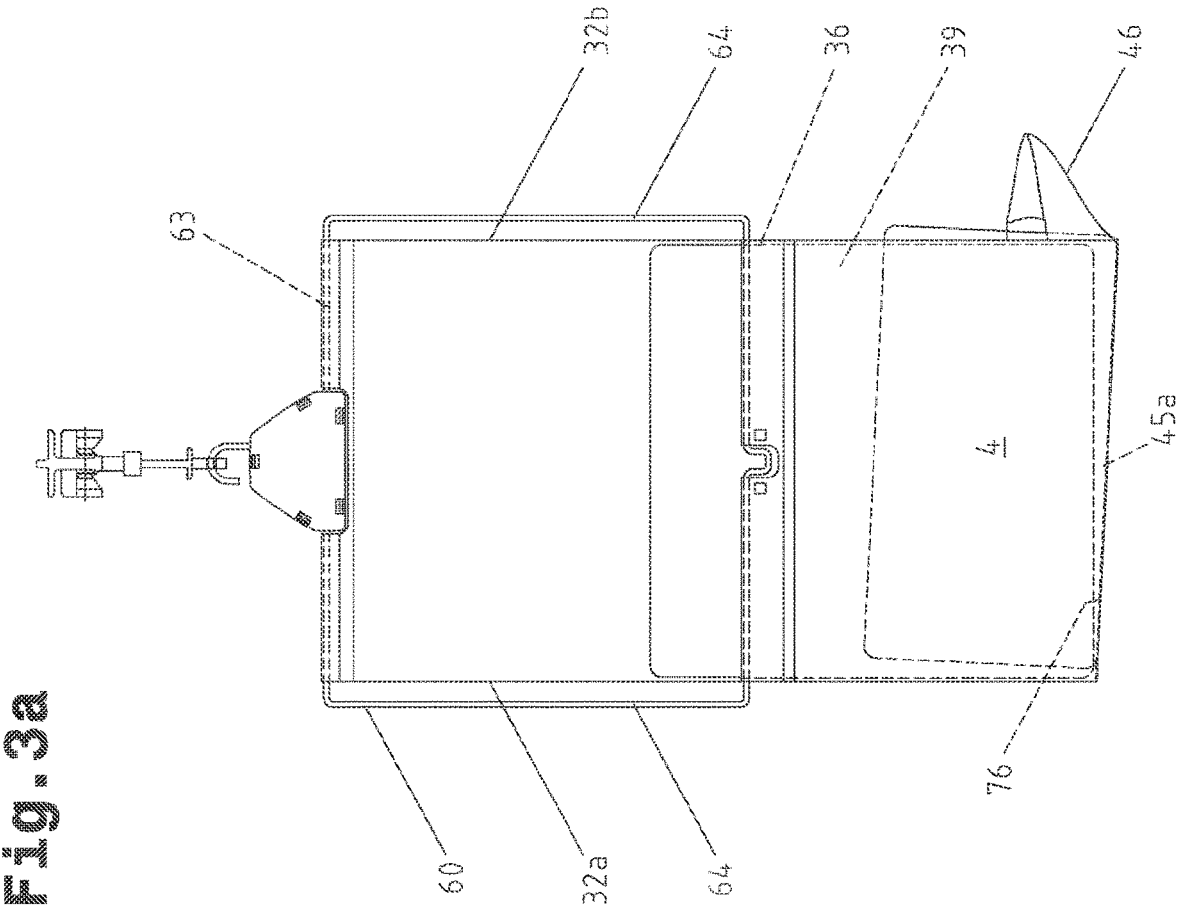

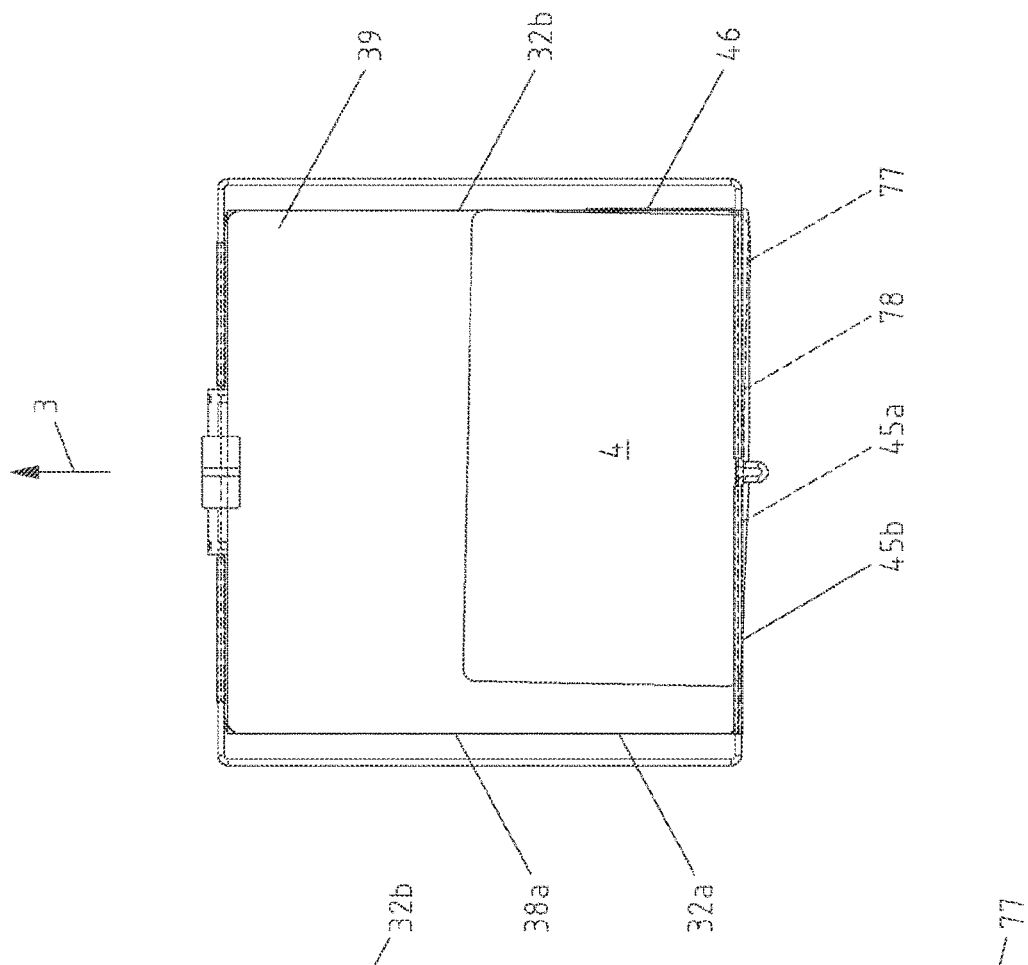
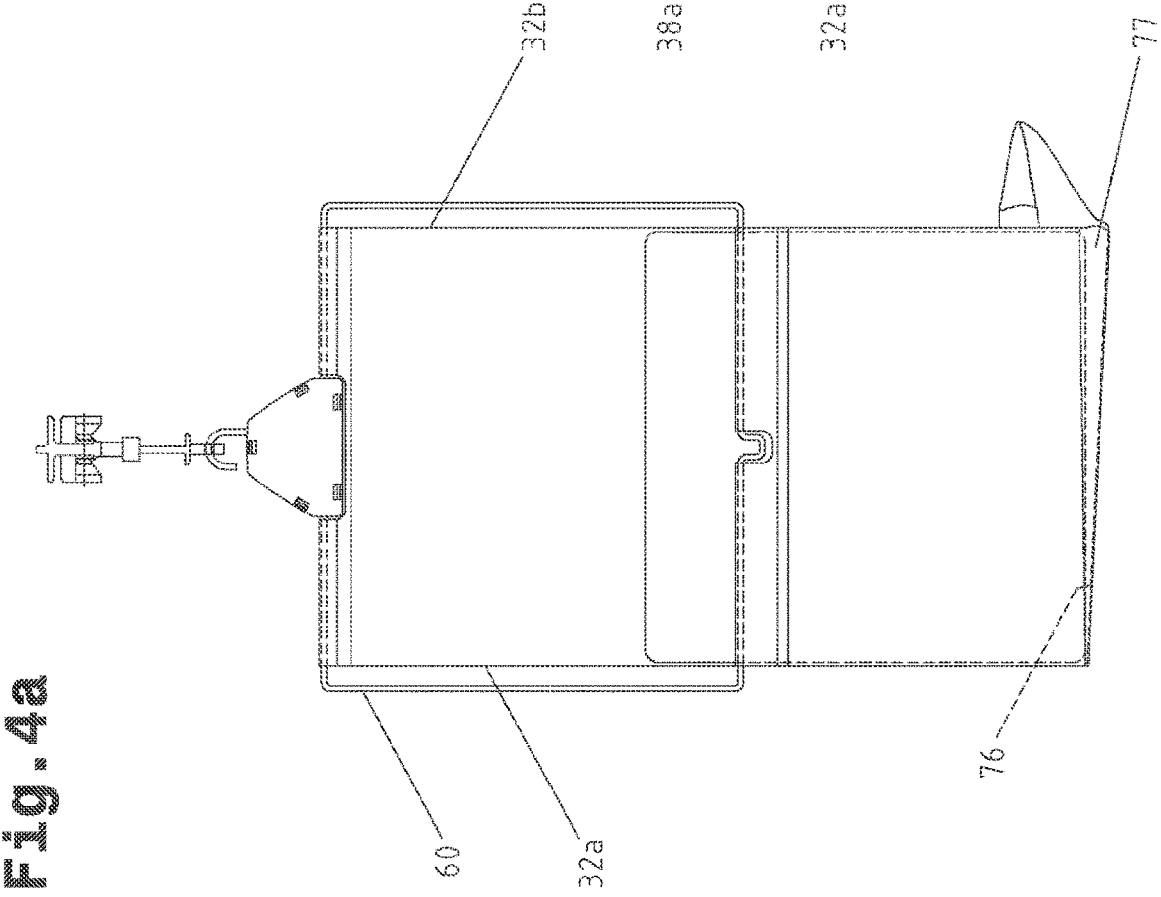

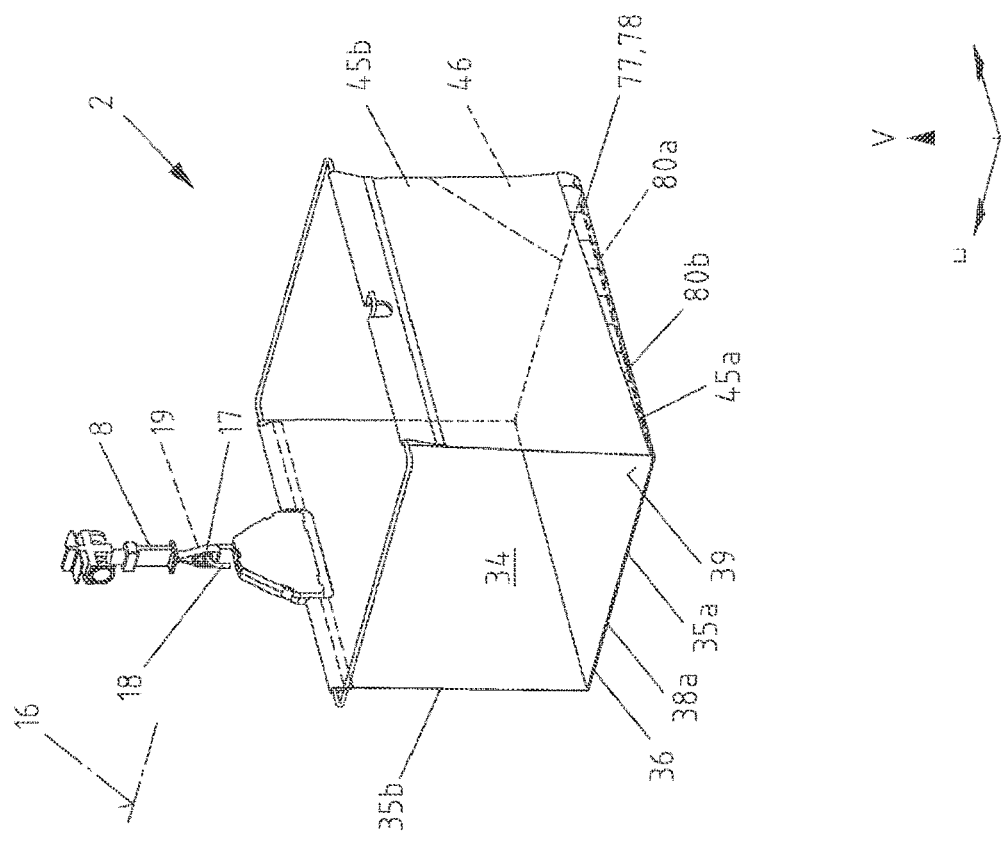
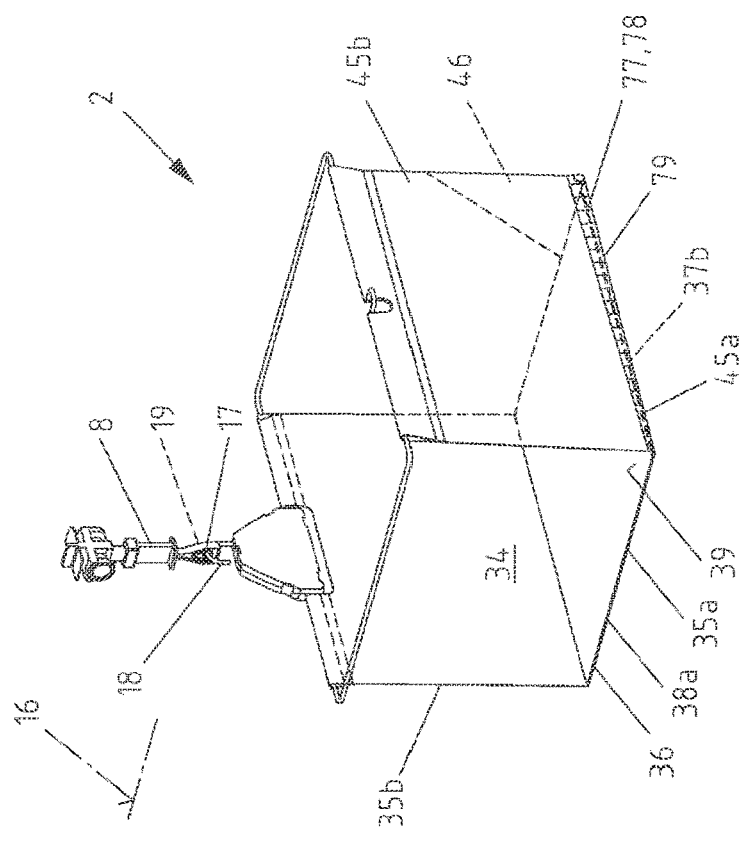

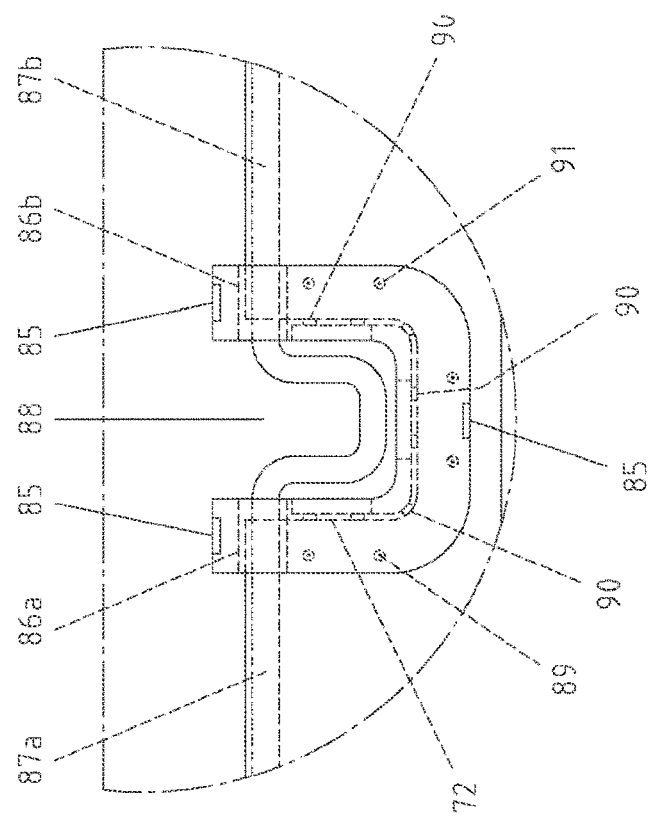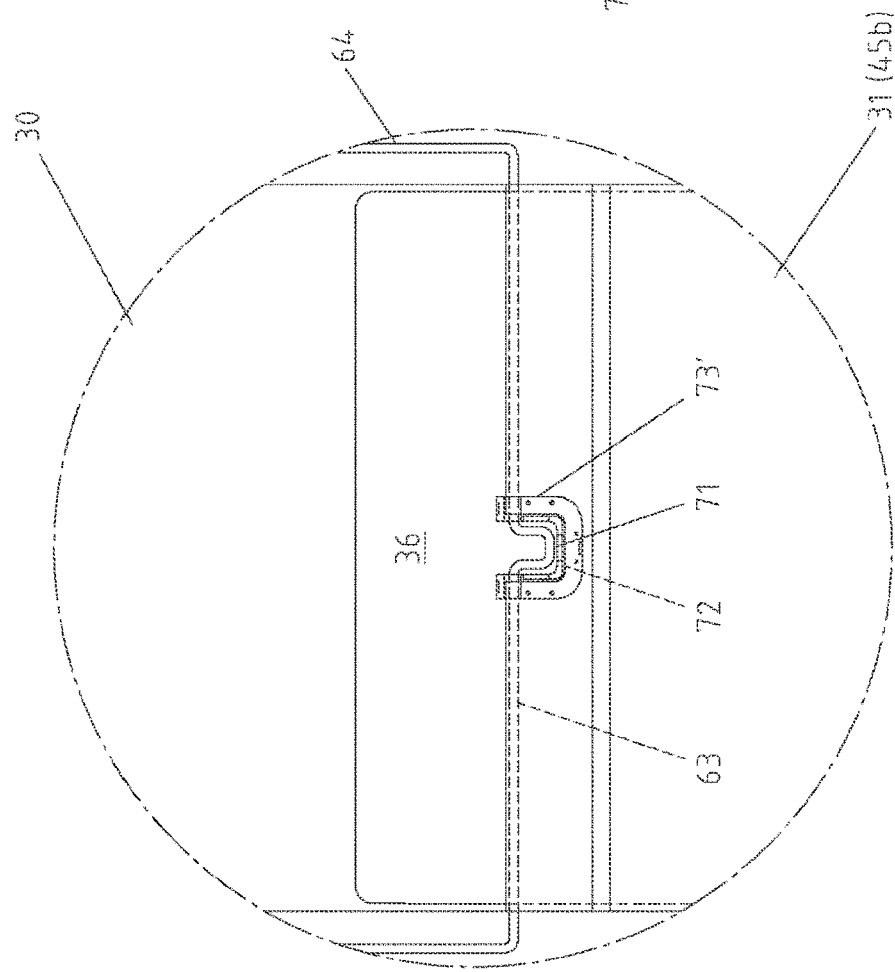

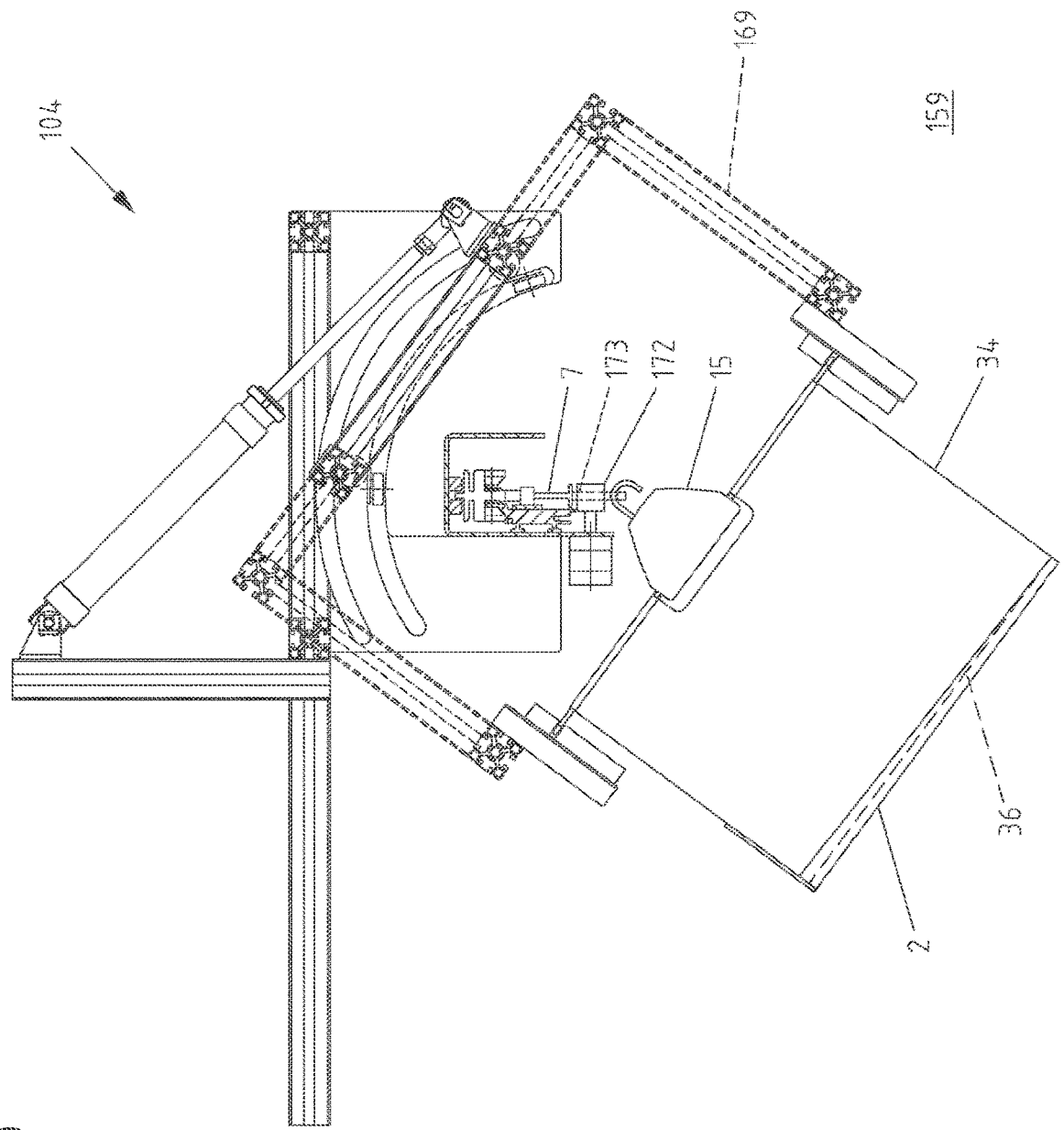

CONVEYED-GOODS CONTAINER FOR AN OVERHEAD CONVEYOR, AND UNLOADING STATION FOR UNLOADING SAME

CROSS REFERENCE TO RELATED APPLICATIONS

This application is the National Stage of PCT/AT2020/060021 filed on Jan. 23, 2020, which claims priority under 35 U.S.C. § 119 of Austrian Application No. A 50059/2019 filed on Jan. 25, 2019, the disclosure of which is incorporated by reference. The international application under PCT article 21(2) was not published in English.

BACKGROUND OF THE INVENTION

1. Field of the Invention

The invention relates to an article container for an overhead conveying device and an unloading station for automatic unloading of an article container loaded with at least one article.

2. Description of the Related Art

DE 10 2004 018 569 A1, DE 20 2017 106 993 U1 and WO 2018/130712 A2 disclose an article container having a bag body with a front wall and a rear wall, a storage space delimited by the front wall and rear wall, and an unloading opening formed laterally on the bag body at least in some regions between the front and rear wall. The bag body is adjustable between a transport position (closed state), in which the storage space is minimized in volume and the articles can be transported by means of the article container, and a loading or unloading position (opened state), in which the storage space is maximized in volume and the articles can be manually removed from the article container through the unloading opening.

Comparable article containers and associated overhead conveying devices are also known from EP 2 130 968 A1 or EP 2 196 415 A, for example. The article containers described therein consist of flexible materials in the form of a loop in which the articles are held. For loading, these transport bags are opened at the top in order to be able to insert the article into the loop. An unloading is done by the article either being taken or ejected sideways from the loop or the loop being opened at the bottom, for example in accordance with EP 2 130 968 A1.

WO 2014/044601 A1 discloses automatic unloading of articles from an article container, in which the article container, which is suspended on a transport carrier via a suspended support, is tilted about a tilting axis running perpendicular to the overhead conveying device.

SUMMARY OF THE INVENTION

An object of the invention is to provide an improved article container. In particular, the article container is to allow safe loading with an article, safe transport of an article and reliable unloading at an automatic unloading station. An object of the invention is to provide an unloading station for automatic unloading of an article container, in which the unloading operation can be carried out reliably at high performance.

The object of the invention is achieved in that in the transport position of the bag body, the first rear wall section forms a transport rest between the first side edge and second side edge, which forms a transport rest surface sloping in the direction of the side wall stop.

The quasi predefined "slope" in the direction toward the side wall stop has a particularly favorable effect on loading the article container. For loading, the bag body is initially adjusted into the loading position, and the article is introduced into the storage space between the front and rear walls. The article now rests on the base plate. Afterwards, the bag body is adjusted from the loading position into the transport position. In this process, the base plate is pivoted and the article slides on the base plate in the direction toward the first rear wall section if it is not already positioned against the first rear wall section. If the article comes upon the predefined "slope" with an edge, it undergoes a tilting movement in the direction toward the side wall stop before the bag body is fully adjusted into the transport position. If the article container is loaded with an article and the bag body with the article has been adjusted into the transport position, the article rests on the first rear wall section and is held clamped by the base plate and the second rear wall section. The clamping force components are set depending on the weight of the article. In combination with the flexible (non-rigid) material in the first rear wall section and second rear wall section, the material clings particularly well to the article. This prevents a movement of the article, so that during transport of the article container a "sliding movement" along the defined "slope" is prevented. The article can be transported particularly reliably, even if the article is not made to rest against the side wall stop during loading of the article container. It is also not necessarily required that the article hast to rest on the side wall stop for transport, in order to prevent the article from falling out of the article container.

Moreover, a single side wall stop, which is opposite the loading and/or unloading opening, is sufficient. The production effort of the article container can be minimized and the production cost can be reduced. Likewise, high transport speeds can be realized in the overhead conveying device.

It is also advantageous if the transport rest is formed continuously between the first side edge and second side edge. Thus, the location on the first rear wall section where an article comes to a stop has no undesired effects. Hence, the loading operation can be carried out in an uncomplicated manner by a person for manual loading or by a loading robot for automatic loading. Moreover, the article container is suitable for articles with various different dimensions and is therefore versatile.

It is particularly advantageous if, in the transport position of the bag body, the second rear wall section forms a support wall, which tapers in the direction of the loading and/or unloading opening, between the first side edge and second side edge, so that the article is held clamped between the base plate in the first front wall section and the support wall in the second rear wall section. By this measure, the clamping effect of the base plate and the special support wall (made of non-rigid material) can be improved even further. This allows also transporting articles which have a lower weight.

It may also prove advantageous if in the loading and/or unloading position of the bag body, the first rear wall section has a guide wall, which protrudes beyond the base plate, between the first side edge and second side edge, which guide wall forms a guide wall surface tapering in the direction of the loading and/or unloading opening. This allows an at least temporary lateral guiding of the article during the unloading operation, in particular at the automatic unloading station.

According to an advantageous embodiment of the invention, the guide wall is formed continuously between the first side edge and second side edge. Specifically, the guide wall extends between the side wall stop and the first side edge, and the guide wall surface opens into the loading and/or unloading opening. The guide wall thus does not form any interfering contours on which the article could get caught. This favors the unloading of the article container.

According to an advantageous embodiment, it is provided that the first rear wall section of the bag body forms a guide wall between the first side edge and second side edge, which guide wall forms a thus designed actuation wall surface, by means of which the article is acted upon with a first force component in the horizontal direction (H) and with a second force component in the vertical direction (V), or the article is acted upon with a first force component in the horizontal direction (H), with a second force component in the vertical direction (V), and with a third force component in a depth direction (T), if the bag body is adjusted from the transport position into the unloading position.

The guide wall, which forms a material section of the flexible (non-rigid) material of the rear wall, is stretched "abruptly" by the adjustment movement of the bag body from the transport position into the unloading position. Thereby, the guide wall exerts a first force component on the article in the horizontal direction (H), a second force component in the vertical direction (V) and/or a third force component in the depth direction (T). In this process, the article is "thrust" by the and by means of the guide wall onto the base plate, so that no jamming and a central discharging of the article from the article container is possible. The "thrust impulse" onto the article can be influenced by the adjustment movement of the bag body from the transport position into the unloading position. It may prove advantageous that the adjustment speed at the beginning of the adjustment movement is higher than that at the end of the adjustment movement. However, the adjustment speed can principally also be constant. The adjustment movement of the bag body from the transport position into the unloading position is preferably carried out continuously.

According to an embodiment of the invention, the article container further comprises a suspended support for the suspended transport of the article container on the overhead conveying device, a frame, by means of which the bag body is suspended on the suspended support and by means of which the bag body can be adjusted between the transport position and the loading and/or unloading position.

The frame can be pivoted relative to the suspended support about an axis preferably oriented essentially horizontally without a high exertion of force, whereby the opening operation and the closing operation of the bag body can be carried out in a particularly easy manner.

The frame comprises either cross struts or cross struts and longitudinal struts connected thereto, wherein the front wall is arranged, with the second front wall section, on a front cross strut, and the rear wall is arranged on a rear cross strut with the second rear wall section.

In an advantageous embodiment of the invention, the frame hast longitudinal struts and cross struts which are connected to each other. The frame can form a rectangular or an essentially square outer contour. In this context, a rectangular and essentially square outer contour means not only a correct square or rectangular shape, but also an outer contour with rounded corners or positioning means arranged on the cross strut.

If the cross struts and the longitudinal struts have essentially the same lengths, the storage space is optimized for a broad spectrum of articles. In particular, it is also advantageous that in the unloading position, the unloading opening is widely stretched between the second front wall section and second rear wall section, such that the unloading operation can be carried out particularly reliably and easily via the unloading opening. Reversely, a loading operation of the article container can also be carried out particularly reliably and easily via the loading opening. The unloading opening thus also forms the loading opening. In principle, loading can be carried out from above, through the frame. Loading can be carried out automatically or manually.

It is also advantageous if the front cross strut comprises a first strut shank and a second strut shank, which protrude separately from each other, orthogonally on the longitudinal struts and run towards each other. The suspended support is mounted so as to be pivoted on the front cross strut. The cross strut comprises the first strut shank and second strut shank, each of which are equally provided with a strut head, which serve to axially fix the frame relative to the suspended support.

According to an advantageous embodiment, the second front wall section comprises a loop formed by folding over the material end region, through which loop the front cross strut or the first strut shank and second strut shank of the front cross strut is threaded. The loop serves to receive the front cross strut or the first strut shank and second strut shank in an articulated manner.

According to an embodiment, it is provided that the front wall forms a material cutout on the second front wall section, which material cutout is penetrated by the suspended support. This limits or prevents an undesired shifting of the front wall relative to the frame and achieves a centering of the front wall relative to the frame.

According to an advantageous embodiment, the second rear wall section comprises a loop formed by folding over the material end region, through which loop the rear cross strut is threaded. The loop serves to receive the rear cross strut in an articulated manner.

It is advantageous if the rear cross strut comprises a positioning means, in particular a shaping having a U-shaped design, and the rear wall comprises a material cutout on the second rear wall section, which material cutout is penetrated by the positioning means, in particular the shaping having the U-shaped design. This limits or prevents an undesired shifting of the rear wall relative to the frame and achieves a centering of the rear wall relative to the frame.

In this regard, it proves advantageous if the second rear wall section is provided, in some sections or circumferentially, with at least one reinforcing stop in the edge region bounding the positioning means and adjoining the material cutout. This prevents the loop from being pushed over/pushed on at the positioning means, even if the article container is pivoted about an axis extending in parallel in the transport direction, as is the case in particular at the unloading station described below.

The object of the invention is achieved in that the unloading device comprises an actuation device, by means of which the article container described above along with the bag body can be tilted about a tilting axis extending essentially in parallel to the longitudinal extension of the overhead conveying device between a provisioning position and an unloading position, wherein in the unloading position, the article can be discharged from the article container through the unloading opening.

For unloading articles from the article container
i) in one step, the bag body is adjusted from the transport position (closed state) into the loading and/or unloading position (opened state) by means of the opening and closing device, and
ii) in one step, the article container along with the bag body is tilted about a longitudinal axis extending essentially in parallel to the longitudinal extension of the overhead conveying device from a provisioning position into an unloading position by means of the unloading device, whereby the articles are discharged from the article container through the unloading opening.

The discharge direction of the articles extends in a discharge plane extending transversely to the transport direction of the article container. The articles can hence be transported only across a very short discharge path, which significantly reduces the discharge time as compared to the unloading stations known from the prior art. Moreover, it is possible to place a take-over plane, to which the conveyed material is to be delivered, essentially at the level of the unloading opening, such that a particularly gentle transfer of the conveyed material to the take-over plane is possible. The take-over plane is for example defined by a conveying device. The bag body can be adjusted into the unloading position prior to the tilting of the article container from the provisioning position into the unloading position, or the article container is already adjusted from the provisioning position into the unloading position into the unloading position during the opening operation of the bag body into the unloading position.

It is favorable for the opening and closing device to comprise an actuation device for automatic opening and closing of the bag body, by means of which actuation device the frame can be pivoted about an axis relative to the suspended support such that the bag body can be adjusted between the transport position (closed state) and the loading and/or unloading position (opened state).

The bag body can be adjusted between the transport position and the loading and/or unloading position by means of the frame which is preferably present. This results in a particularly simple structure of the article container. The opening and closing device can also be designed particularly simply.

It also proves to be particularly advantageous if the actuation device comprises a driver mechanism having
an inlet section aligned upstream in a transport direction of the article container,
an outlet section aligned downstream in the transport direction of the article container, and
an unloading section arranged between the inlet section and the outlet section, wherein the inlet section forms a tilted guide track that can be brought into an abutting contact with the frame such that the frame is pivoted during the transport of the article container to the unloading station, whereby the bag body is adjusted from the transport position into the loading and/or unloading position.

The driver mechanism does not require a drive and is thus structured simply. The inlet section comprises a tilted guide track that can be brought into an abutting contact with the frame such that the frame is adjusted between different tilting states and, in the course of this, the bag body is adjusted from the transport position into the loading and/or unloading position. The adjustment between the transport position and the loading and/or unloading position can be carried out very gently. The article container is handled with care. Moreover, the continuous opening operation of the bag body allows the articles to be centered in the storage space, which facilitates the discharge of the articles from the article container.

It is also advantageous if the unloading section forms an essentially horizontal guide track that can be brought into an abutting contact with the frame such that the frame is held in the pivoted deflection state during the unloading operation, whereby the bag body also remains in the opened state.

The article container can be guided during its tilting movement. The guide track extends in parallel to the transport direction of the article container, as does a tilting axis.

It also proves to be advantageous if the outlet section forms a tilted guide track that can be brought into an abutting contact with the frame such that the frame is pivoted during the transport of the article container away from the unloading station, whereby the bag body is adjusted from the loading and/or unloading position into the transport position.

The outlet section comprises a tilted guide track that can be brought into an abutting contact with the frame such that the frame is adjusted between different tilting states and, in the course of this, the bag body is adjusted from the loading and/or unloading position (opened state) into the transport position (closed state). The adjustment between the loading and/or unloading position and the transport position can be carried out very gently. The article container is handled with care.

It proves to be favorable if the overhead conveying device, for the transport of the article container to the unloading station and for the transport of the article container away from the unloading station, comprises transport carriers movable by means of a drive device or by means of gravity, wherein the transport carrier and the suspended support are coupled to one another in an articulated manner, whereby the suspended support is pivotable about an axis extending essentially in parallel to the overhead conveying device relative to the transport carrier.

The transport carrier can be moved by means of a frictional drive or a form-fit drive. An embodiment in which the transport carriers can be moved autonomously by means of a self-propulsion is also possible. The transport carriers can be transported to the unloading station and away from the unloading station very dynamically, which promotes a high unloading performance.

However, the transport carriers can also be transported by means of gravity if the profile rail on which the transport carriers are moved has a slope. This embodiment is favorable where capital costs are to be kept low.

It can also be provided that a locking device for arresting the transport carrier during an unloading operation of the article container is allocated to the opening and closing device of the unloading station.

The transport carrier is temporally arrested for unloading of the article container, which allows for an unwanted movement of the transport carrier and the article container in the transport direction and/or transversely to the transport direction to be prevented during the tilting movement of the article container. The unloading process can also be carried out particularly reliably for large and/or heavy articles.

It is also possible that the opening and closing device of the unloading station comprises a guide device for laterally guiding the transport carrier during a transport movement of the transport carrier through the overhead conveying device for transporting the article container to the unloading station and transporting the article container away from the unloading station.

For unloading the article container, the transport carrier is guided laterally which prevents unwanted tilting of the transport carrier about an axis extending in the transport direction during the tilting movement of the article container. The unloading process can also be carried out particularly reliably for large and/or heavy articles.

An advantageous design is also possible if the actuation device of the unloading device comprises a frame structure that can be tilted by means of a drive between an initial position and an actuation position about an axis extending in parallel to the transport direction of the article container and the actuation device of the opening and closing device is mounted on the frame structure.

The opening and closing device is moved together with the frame structure that can be tilted between the initial position and the actuation position, which allows for an opening operation of the bag body and the tilting operation of the article container to be carried out simultaneously and/or for a closing operation of the bag body and the back-tilting operation of the article container to be carried out simultaneously. The unloading operation can hence be accelerated additionally. Moreover, the unloading operation can be carried out without stopping of the transport movement. However, in general, the transport speed of the transport carriers and the article container in the transport movement along the unloading station can vary.

BRIEF DESCRIPTION OF THE DRAWINGS

For the purpose of better understanding of the invention, it will be elucidated in more detail by means of the figures below.

These show in a respectively very simplified schematic representation:

FIG. 1 an overhead conveying device for transporting article containers, in perspective views;

FIGS. 2a, 2b the article container with a first embodiment for the bag body, FIG. 2a in the transport position and FIG. 2b in the loading position or unloading position (article not depicted), in perspective views;

FIGS. 3a, 3b the article container in the transport position (article depicted schematically), in a rear view and in a top view;

FIGS. 4a to 4c the article container with a second embodiment for the bag body, FIG. 4a in the transport position (article not depicted), FIG. 4b in the loading position or unloading position (article depicted schematically) and FIG. 4c in the loading position or unloading position (article not depicted), in different views;

FIG. 4d the article container with a third embodiment for the bag body in the loading position or unloading position (article not depicted), in a perspective view;

FIGS. 6a, 6b an enlarged detail from FIG. 3a with a view onto a positioning means and a reinforcing stop, in a second embodiment;

FIG. 16b a view onto the unloading device and a schematically shown article container according to FIG. 12, said article container being in an unloading position, partially in a sectional view.

DETAILED DESCRIPTION OF THE PREFERRED EMBODIMENTS

Figure 5B:
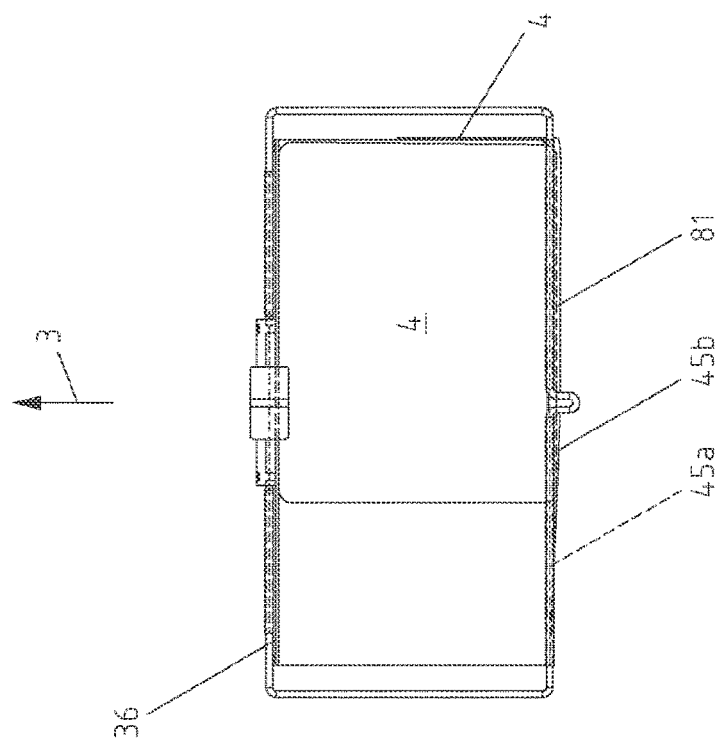
FIGS. 5a, 5b the article container with a fourth embodiment for the bag body in the transport position (article depicted schematically), in a different view.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure, and in case of a change of position, are to be analogously transferred to the new position.

FIG. 1 shows a section of an overhead conveyor system comprising an overhead conveying device 1 for transporting article containers 2 in a transport direction 3. The article container 2 is designed as a transport bag and/or hanging bag. The article container 2 can be loaded with an article 4. Preferably, a single article 4 is received in the article container 2. In general, more than one article 4 may also be received in the article container 2. The article container 2 can transport different articles 4, which vary in their geometry/dimension. The articles 4 are for example cardboard boxes, foil bags (so-called "polybags" made from polyethylene or polypropanol) or the like. Such foil bags are predominantly used in the textile industry and are for example used for packaging T-shirts, shirts and the like.

The section of the overhead conveyor system in FIG. 1 shows the overhead conveying device 1 for transporting the article containers 2 to the unloading station and for transporting the article containers 2 away from the unloading station.

The overhead conveyor system may additionally comprise an unloading station 104 (see, for example, FIG. 9) for automatic unloading of the article containers 2. The overhead conveying device 1 serves for transporting the article containers 2 to the unloading station and for transporting the article containers 2 away from the unloading station.

The overhead conveyor system may additionally comprise a loading station for automatic loading of an article container 2, as it is described, for example, in WO 2018/130712A2. With regard to the different embodiments of the loading station for automatic loading of an article container 2, the detailed disclosure of WO 2018/130712 A2 is made the subject matter of this disclosure. In general, it is also conceivable that an article container 2 is loaded manually in the loading station. The overhead conveying device 1 serves for transporting the article containers 2 into the loading station and for transporting the article containers 2 away from the loading station.

On the other hand, the overhead conveying device 1 serves for transporting the article containers 2 between the loading station for manual or automatic loading of an article container 2 and the unloading station 104 for automatic unloading of an article container 2.

According to the embodiment shown, the overhead conveying device 1 comprises transport carriers 7 which can be moved along the overhead conveying device 1 by means of a drive device 5.

In the shown exemplary embodiment, the transport carriers 7 are moved by means of a frictional drive (drive device 5). The transport carrier 7 shown, for example, in FIG. 2a comprises a suspended body 8, a (first) roller 9 rotatably mounted on an axle, and a friction surface 10, the latter of which can be brought into frictional contact with an endlessly revolving friction belt 11 of the overhead conveying device 1. The (second) roller 9 shown in the Figs. is optional and serves for guiding the transport carrier 7 at a switching point. The transport carrier 7 is guided on a profile rail 12 of the overhead conveying device 1 via the (first) roller 9 and can be moved into the transport direction 3 by the friction drive. Such a transport carrier 7 is for example described in DE 10 2011 080 280 A1, wherein the shown embodiment of the transport carrier in DE 10 2011 080 280 A1 is different in that the suspended body 8 comprises a pivotal mounting.

According to an embodiment which is not shown, the transport carriers 7 can be moved by means of a positive engagement drive (drive device 5). For this purpose, an endlessly revolving drive belt of the overhead conveying device 1 can be provided with driver elements protruding thereon, which come into interlocking engagement with the transport carriers 7.

A combination of a friction drive and a positive engagement drive is also possible.

The described drive devices 5 are in no way to be understood restrictively, but only show different possibilities of how a driving force is transmitted to the transport carriers 7 in order to move them (so as to be driven) on the overhead conveying device 1 in the transport direction 3.

A design in which the transport carriers 7 comprise a drive device and are moved (so as to be driven) in the transport direction 3 on the overhead conveying device 1 is also conceivable.

Independently thereof, a transport movement of the transport carriers 7 without a drive device, would also be possible in that the transport carriers 7 are moved (nondriven) by gravity in the transport direction 3 on the overhead conveying device 1.

FIGS. 2a, 2b, 3a and 3b show the article container 2 (hanging bag) with a first embodiment of a bag body. FIG. 2a shows the transport position and FIG. 2b shows an opened state, which relates to the loading position if the article container 2 is to be loaded, or to the unloading position if the article container 2 is to be unloaded.

In a preferred embodiment, the article container 2 (hanging bag) comprises a suspended support 15, wherein the suspended support 15 and the transport carrier 7 are coupled with one another in an articulated manner via a hinged connection such that the suspended support 15 is pivotable relative to the transport carrier 7 about an axis 16 extending essentially in parallel to the overhead conveying device 1 (and/or essentially in parallel to the transport direction 3).

The transport carrier 7 can be provided with a first coupling element 17 and the suspended support 15 can be provided with a second coupling element 18, wherein the first coupling element 17 and second coupling element 18 can be coupled and form the hinged connection. The first coupling element 17 comprises a pivotal mounting 19 and the second coupling element 18 comprises a pivot bearing axle 20. The pivot bearing axle 20 is formed on a hook.

According to another embodiment which is not shown, the hinged connection between the suspended support 15 and the transport carrier 7 comprises an elastic body, in particular of an elastomer material, which is connected to the suspended support 15 on the one hand and to the transport carrier 7 on the other hand. The suspended support 15 and the transport carrier 7 are connected to one another via the elastic body (the elastic hinged connection) preferably permanently and/or unreleasably.

The shown article container 2 for transporting an article 4 is particularly suitable for automatic unloading at the unloading station 104 to be described below.

The article container 2 comprises a bag body that is adjustable between a transport position (FIG. 2a) and a loading and/or unloading position (FIG. 2b).

The bag body comprises
a front wall 30 and a rear wall 31,
a first side edge 32a and a second side edge 32b along the front wall 30 and rear wall 31,
a loading and/or unloading opening 34 formed on a first side of the bag body at least in some regions between the front and rear wall 30, 31,
a side wall stop 35 formed on a second side of the bag body at least in some regions between the front and rear wall 30, 31, against which side wall stop 35 the article 4 can be placed (see FIG. 3a), and
a storage space for storing the article 4 between the front and rear wall 30, 31.

Figure 8:
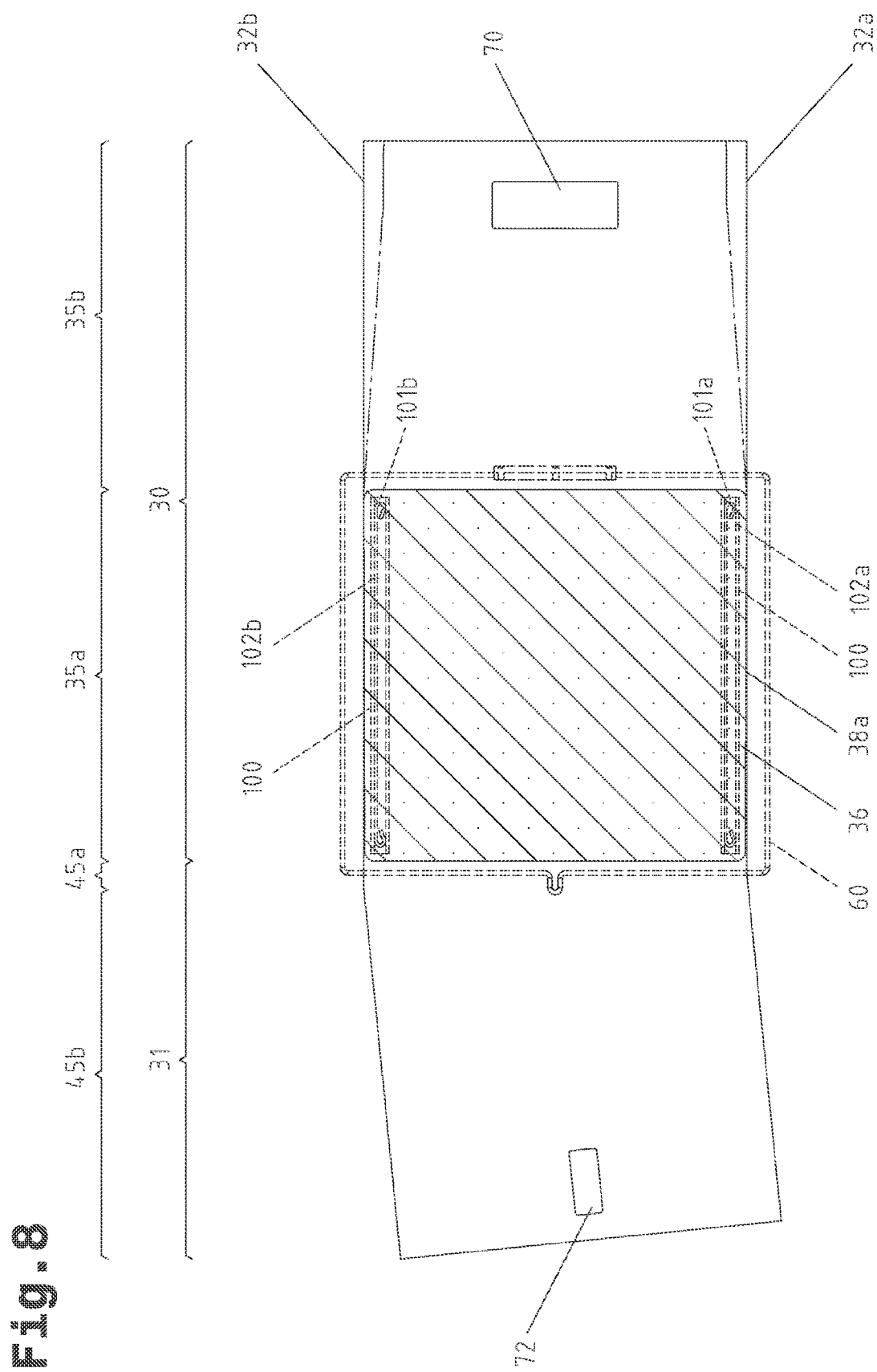
FIG. 8 a material cutting for the bag body of the article container, in a top view onto an inner side.

In a preferred embodiment, the front wall 30 and rear wall 31 are cut from a continuous length of textile, length of film, a braid, a knitted fabric, a woven fabric or the like. A material cutting, in particular the textile cutting is shown in FIG. 8.

The front wall 30 and rear wall 31 do not have to be separately interwoven, sewn together, adhered to one another or be joined in a different manner. This saves a further step in the production of the bag body and thus production cost of the article container 2.

However, the invention is not limited to this but the front wall 30 and rear wall 31 may also be formed as one piece each if need be. For example, the front wall 30 and rear wall 31 are each formed separately from a textile, a film or the like, wherein the front wall 30 and rear wall 31 are directly interwoven, knitted together, sewn together, adhered to one another or joined in a different manner. The front wall 30 and rear wall 31 continuously blend into each other.

The front wall 30 comprises a first front wall section 35a, a second front wall section 35b and a base plate 36. The base plate 36 is provided in the first front wall section 35a. In particular, the first front wall section 35a comprises the base plate 36 and/or the first front wall section 35a forms the base plate 36.

The base plate 36 is preferably produced separately from the bag body (according to a shown first embodiment) and is arranged in the first front wall section 35a and joined, in particular sewn or adhered, to the front wall 30. Such a base plate 36 is preferably arranged on the inside of the bag body in the first front wall section 35a. Such a base plate 36 is made, for example, from plastic and has a thickness of a maximum of 2 mm. In practice, it has been shown that even at a minimum thickness of 1 mm, a sufficient dimensional stability is given, and the loading and/or unloading can take place at an automatic loading device and/or unloading device in a very reliable manner.

Alternatively, the first front wall section 35a itself may form the base plate 36 (according to a second embodiment that is not shown). For example, the first front wall section 35a is designed to have a greater material thickness or a higher material density compared to the second front wall section 35b. According to these measures, multiple material layers of the base material (textile or film) for the front wall 30 are laid on top of each other, and some of the material layers (at least the outer material layers, if the base material is laid on top of each other in more than two layers) are joined together, in particular sewn together or adhered to one another, in order to ultimately form the base plate 36, or the base material (textile) for the front wall 30 is woven in a close-meshed manner in the first front wall section 35a, in order to ultimately form the base plate 36. However, the base material (textile carrier material) for the front wall 30 may, for example, also be provided with a plastic material coating in the first front wall section 35a in order to ultimately form the base plate 36.

According to both the first embodiment and the second embodiment, the base plate 36 (and/or reference may be made to a "base structure") overall leads to the front wall 30 being formed with a greater rigidity and/or dimensional stability in the first front wall section 35a than in the second front wall section 35b. In other words, the first front wall section 35a is designed to be more rigid and/or more dimensionally stable compared to the second front wall section 35b.

Lastly, a combination of the embodiment mentioned above is also possible to obtain the desired relative rigidity of the first front wall section 35a compared to the second front wall section 35b.

The base plate 36 and/or "base structure" is dimensionally stable, leading to the base plate 36 and/or "base structure" being deformed little to not at all under the application of force (weight force of the article 4 when resting on the base plate 36 and/or "base structure"). The base plate 36 (base structure) is designed as a square. In general, it may also be rectangular.

As depicted in FIG. 2b, the base plate 36 (base structure) comprises
- a first longitudinal edge 37a,
- a second longitudinal edge 37b extending at a distance from the first longitudinal edge 37a,
- a first end edge 38a extending between the first longitudinal edge 37a and the second longitudinal edge 37b,
- a second end edge 38b extending between the first longitudinal edge 37a and the second longitudinal edge 37b, and
- a support and rest surface 39, which faces the storage space.

The base plate 36 (base structure) essentially adjoins the first side edge 32a with the first end edge 38a and essentially adjoins the second side edge 32b with the second end edge 38b.

The second front wall section 35b adjoins the first longitudinal edge 37a, and the first rear wall section 45a adjoins the second longitudinal edge 37b.

It is also advantageous if the first longitudinal edge 37a forms a first folding edge, and the second longitudinal edge 37b forms a second folding edge. The folding edges serve as material hinges to which the second front wall section 35b and the first rear wall section 45a is hinged (according to the embodiment in FIGS. 2a, 2b, 3a and 3b), and allow a relative shift between the front wall 30 and rear wall 31.

The support and rest surface 39 has a double function. On the one hand, the base plate 36 (base structure) may serve to support the article 4 when the bag body is adjusted into the transport position and the article 4 is held clamped between the front wall 30 and rear wall 31. On the other hand, the base plate 36 (base structure) may serve for the article 4 to rest on when the bag body is adjusted into the loading and/or unloading position and the article container 2 is being loaded or unloaded.

It also proves advantageous if the support and rest surface 39 of the base plate 36 (base structure) opens into the loading and/or unloading opening 34. The base plate 36 (base structure) may also serve as a "slide" when the bag body is adjusted into the unloading position, as will be described below. If the support and rest surface 39 is designed as a sliding surface, the (automatic) unloading of the article 4 in particular may be favored.

The rear wall 31 comprises a first rear wall section 45a and a second rear wall section 45b. The first rear wall section 45a adjoins the first front wall section 35a, the latter being provided with the base plate 36 (base structure).

The rear wall 31 is formed with a lower rigidity and/or dimensional stability in the first rear wall section 45a than in the first front wall section 35a. In other words, the first front wall section 35a is designed to be more rigid and/or more dimensionally stable compared to the first rear wall section 45a.

As described above, the front wall 30 and rear wall 31 are made from a flexible (non-rigid) material, in particular a textile material, and exclusively the first front wall section 35a is designed to be stiffened/reinforced by the base plate 36 (base structure). The flexible (non-rigid) material is preferably supple and can, if applicable, have elastic properties. In this way the article 4 can be surrounded at least in some regions, for example at corners and edges, in a tight-fitting manner by the flexible (non-rigid) material. In this way a form and/or friction fit for holding the article 4 within the article container 2 can be caused.

The second front wall section 35b, first rear wall section 45a and second rear wall section 45b are produced from a flexible (non-rigid) material, in particular a textile material. An additional stiffening of the flexible (non-rigid) material is not necessary and also not provided.

As can be seen in FIG. 2a, the front wall 30 and rear wall 31 are approximated to one another in the transport position. In the transport position, the horizontal distance is smaller than the corresponding horizontal distance in the loading and/or unloading position. The horizontal distance is reduced to a minimum and results from the geometry/dimensions of the article 4, which is accommodated in the storage space for transport. In the transport position of the bag body, the storage space is minimized in volume. Usefully, the support and rest surface 39 is oriented essentially vertically in the transport position. The article 4 is accommodated between the front wall 30 and rear wall 31 in the storage space. As can be seen in FIG. 3a, 3b, the article 4 is held clamped by the base plate 36 (base structure) and the second rear wall section 45b when the bag body is in the transport position. Additionally, the article 4 rests on the first rear wall section 45a and/or the transport rest described below.

As can be seen in FIG. 2b, the front wall 30 and rear wall 31 are moved away from each other, and the loading and/or unloading opening 34 is delimited by the front wall 30 and rear wall 31 and adjoins the first end edge 38a of the bag body 36 (base structure) when the bag body is in one of the opened states, which relates to the loading position if the article container 2 is to be loaded, or to the unloading position if the article container 2 is to be unloaded (loading and/or unloading position). In the loading and/or unloading position, the horizontal distance is greater than the corresponding horizontal distance in the transport position. The horizontal distance is preferably enlarged to a maximum in order to reliably unload the article 4 from the storage space and/or to reliably load the article container 2. In particular, the bag body comprises a loading and/or unloading opening 34 delimited by the first side edge 32a and formed at least in some regions between the front and rear wall 30, 31.

Although it is provided that the loading and/or unloading opening 34 adjoins the first end edge 38a, this does not exclude that a side wall extends between the front wall 30 and rear wall 31 above the loading and/or unloading opening 34. It must merely be ensured that the loading and/or unloading opening 34 is sized in such a way that the largest article 4 can be moved through the loading and/or unloading opening 34 without colliding with the side wall.

In the loading and/or unloading position, the storage space is maximized in volume. Usefully, the support and rest surface 39 is oriented essentially horizontally in the loading position. This allows the loading operation to be carried out in a simple manner. Preferably, depending on the geometry/ dimensions of the article 4, the bag body is always adjusted into the same opened state, which allows for a particularly simple structure of the unloading station described below.

In a preferred embodiment, the article container 2 can be loaded (manually or automatically) with the article 4 via the loading and/or unloading opening 34. Alternatively, an article 4, which loads the support and rest surface 39 after the bag body has been adjusted, may be unloaded (manually or automatically) via the loading and/or unloading opening 34.

As can be seen well in FIGS. 2a, 2b, 3a, 3b, the bag body comprises a side wall stop 46 on its second side, which is formed at least in some regions between the front and rear wall 30, 31, against which side wall stop 46 the article 4 can be placed. Specifically, the bag body comprises a side wall stop 46 adjoining the second side edge 32b and formed at least in some regions between the front and rear wall 30, 31, against which side wall stop 46 the article 4 can be placed. Preferably, the bag body comprises exclusively this (only) side wall stop 46.

In the present case, the (stretched) side wall stop 46 is formed as a triangle and adjoins the first front wall section 35a, first rear wall section 45a and second rear wall section 45b. Preferably, the side wall stop 46 extends approximately up to half, preferably approximately up to a third, of the first front wall section 35a and tapering from the first front wall section 35a vertically upwards, approximately up to half of the second rear wall section 45b.

Alternatively, it is also conceivable that the side wall stop 46 is formed as a rectangle and adjoins the first front wall section 35a, second front wall section 35b, first rear wall section 45a and second rear wall section 45b.

Such a side wall stop 46 is especially cut from a separate material web and joined with the at least one material web for the front wall 30 and rear wall 31, in particular sewn to the front wall 30 and rear wall 31.

As depicted only in FIG. 2b, the side wall stop 46 may form a material cutout 47, which is arranged in the region of the first rear wall section 45a. The material cutout 47 serves the purpose that liquid accumulating in the bag body can flow out of the article container 2.

In the exemplary embodiment shown, the article container 2 comprises the suspended support 15 for suspended transport on the overhead conveying device 1 (see FIG. 1) and an (optional) frame 60, by means of which the bag body is suspended on the suspended support 15, and by means of which the bag body can be adjusted between the transport position and the loading and/or unloading position. By different inclined positions of the frame 60, a horizontal distance between the front wall 30 and rear wall 31 can be changed.

At this point, it should also be noted that, as an alternative to the embodiment described above, the article container 2 may also be loaded through the frame 60 and from above if the bag body is adjusted into the loading and/or unloading position. According to this embodiment, the frame 60 forms the loading opening. However, the article container 2 is still unloaded via the unloading opening 34. In other words, it is not absolutely necessary that the bag body forms both the loading opening 34 for loading the article container 2 and the unloading opening 34 for unloading the article container 2 (thus, a common loading and unloading opening 34) on the first side, but only the unloading opening 34.

The frame 60 is mounted so as to be pivotable on and relative to the suspended support 15, about an axis 61 that is preferably oriented essentially horizontally. The axis 61 is preferably arranged closer to the front wall 30 than to the rear wall 31.

The frame 60 forms cross struts 63 extending in parallel at a mutual distance and longitudinal struts 64 extending between the cross struts 63 in parallel at a mutual distance. The frame 60 forms an essentially rectangular or an essentially square outer contour. Preferably, a wire frame is used as the frame 60.

As can be seen in FIGS. 2a, 2b, 3a, 3b, the front wall 30 is mounted, with the second front wall section 35b, on a front cross strut 63 in an articulated manner (first pivot bearing), and the rear wall 31 is mounted, with the second rear wall section 45b, on a rear cross strut 63 in an articulated manner (second pivot bearing). The first front wall section 35a is thus arranged at a distance from the front cross strut, and the first rear wall section 45a is thus arranged at a distance from the rear cross strut.

The second front wall section 35b forms a loop formed by folding over the material end region, through which loop the front cross strut is threaded. The second rear wall section 45b forms a loop formed by folding over the material end region, through which loop the rear cross strut is threaded.

It can be seen that by means of the first pivot bearing, second pivot bearing, the first longitudinal edge 37a (first folding edge) and second longitudinal edge 37b (second folding edge), a four-bar linkage is formed, whereby the bag body can be adjusted between the transport position and loading and/or unloading position particularly easily.

Figure 7:
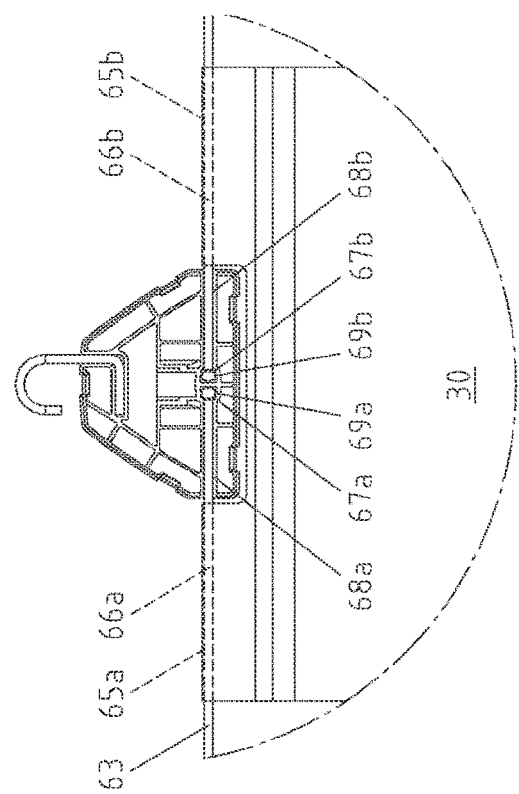
FIG. 7 a suspended support for the article container with a removed first half of the suspended support and a detail view onto a second half of the suspended support and a partial cutout of the frame.

It may also be provided, as shown in more detail in FIG. 7, that the front cross strut 63 comprises a first strut section 65a and a second strut section 65b, which protrude separately from each other, in each case orthogonally on the longitudinal struts 64, and run towards each other. In particular, the first strut section 65a and second strut section 65b are arranged coaxially.

The first strut section 65a comprises a cylindrical strut shank 66a and a first strut head 67a at its free end. The strut head 67a protrudes in the radial direction on an outer contour of the cylindrical strut shank 66a and is preferably produced as one piece with the strut shank 66a. The strut head 67a is formed by upsetting material, for example.

The second strut section 65b comprises a cylindrical strut shank 66b and a second strut head 67b at its free end. The strut head 67b protrudes in the radial direction on an outer contour of the cylindrical strut shank 66b and is preferably produced as one piece with the strut shank 66b. The strut head 67b is formed by upsetting material, for example.

According to this exemplary embodiment, the suspended support 15 comprises a first bearing section 68a, a first strut head receptacle 69a, a second bearing section 66b and a second strut head receptacle 69b. The suspended support 15 may comprise a first suspended support half and a second suspended support half, which are preferably permanently joined. For example, the first suspended support half and second suspended support half are joined via coupling elements cooperating in a positively locking and/or force-fitting manner or via a material bonded connection.

If the suspended support 15 is assembled from the first suspended support half and second suspended support half, the first bearing section 68a, the first strut head receptacle 69a, the second bearing section 66b and the second strut head receptacle 69b are formed mirror-symmetrically relative to a parting plane and are divided by the parting plane. Thus, one half of the bearing section 68a is formed at the first suspended support half and the other at the second suspended support half. When the first suspended support half and second suspended support half are connected to form the suspended support 15, a first bearing section half and a second bearing section half form the first bearing section 68a. Thus, the parting plane of the suspended support 15 is placed such that the first bearing section 68a is parted in the middle by the parting plane. The same is to be transferred to the first strut head receptacle 69a, the second bearing section 66b and the second strut head receptacle 69b.

The first bearing section 68a and second bearing section 68b are arranged coaxially and have the (common) axis 61. The first strut shank 66a and first bearing section 68a are arranged coaxially. The second strut shank 66b and second bearing section 68b are arranged coaxially.

The first strut head 67a is arranged inside the first strut head receptacle 69a in order to hold the first strut section 65a, which is pivotable relative to the first bearing section 68a and the first strut head receptacle 69a, positioned in the axial direction.

The second strut head 67b is arranged inside the second strut head receptacle 69b in order to hold the second strut section 65b, which is pivotable relative to the second bearing section 68b and the second strut head receptacle 69b, positioned in the axial direction.

It should be noted that the invention is in no way to be understood to be limited to this advantageous embodiment of the frame 60. In fact, the frame 60 may comprise and/or form a (circumferential) closed frame structure. Otherwise, the frame 60 may also be designed according to the different embodiments as described in DE 10 2004 018 569 A1.

Independently of the design of the suspended support 15 and the frame 60, this embodiment provides that the frame 60 can be pivoted with the front cross strut 63 about the horizontally oriented axis 61, on and relative to the suspended support 15, so that the bag body can be adjusted between the transport position and the loading and/or unloading position.

As depicted in FIGS. 7 and 8, the front wall 30 may form a material cutout 70 on the second front wall section 35b, which material cutout 70 is penetrated by the suspended support 15. This limits or prevents an undesired shifting of the front wall 30 relative to the frame 60 and achieves a centering of the front wall 30 relative to the frame 60.

Figure 6:
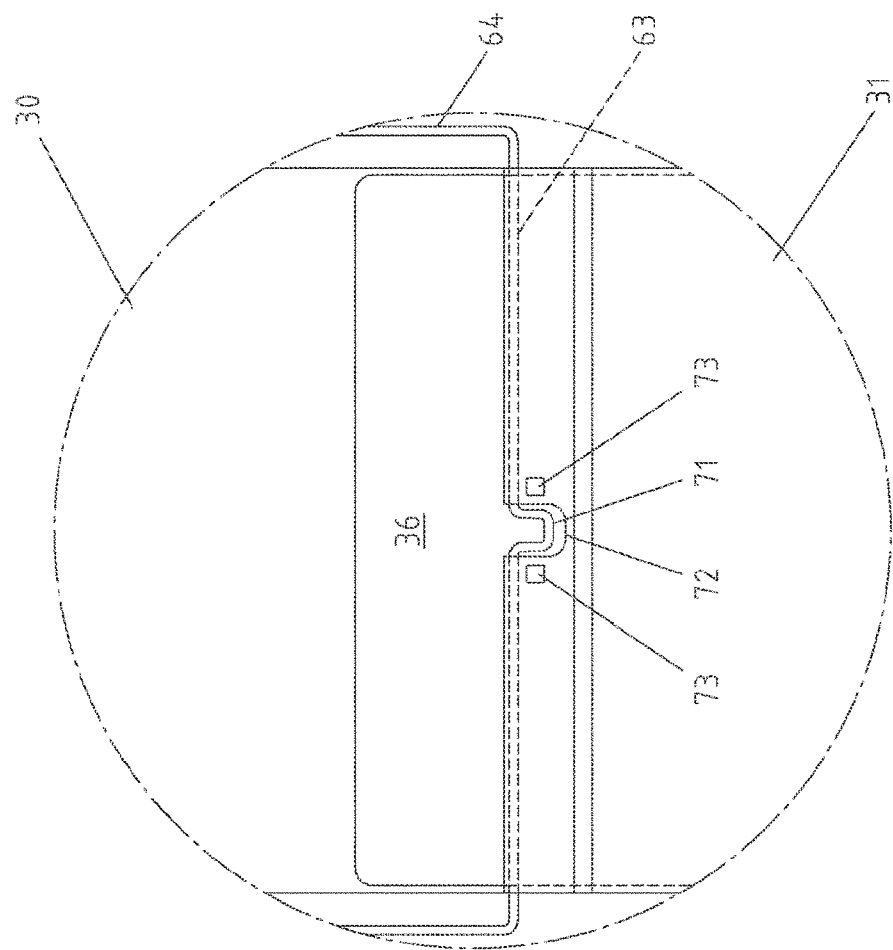
FIG. 6 an enlarged detail from FIG. 3a with a view onto a positioning means and a reinforcing stop, in a first embodiment.

As depicted in FIGS. 6 and 8, the rear cross strut 63 may be provided with an (optional) positioning means. Preferably, the positioning means is arranged about halfway between the longitudinal struts 64. The positioning means is, for example, a shaping 71, which preferably has a U-shaped design. Instead of the shaping 71, a stop body, which is fixedly connected to the rear cross strut 63, may be provided on the rear cross strut 63 as a positioning means. The stop body is, for example, a plastic disc. The rear wall 31 forms a material cutout 72, which is penetrated by the positioning means (specifically the shaping 71), on the second rear wall section 45b. By means of the positioning means, an undesired shifting of the rear wall 31 relative to the frame 60 is limited or prevented, and a centering of the rear wall 31 relative to the frame 60 is achieved.

It has also proven advantageous if the second rear wall section 45b is provided, in some sections or circumferentially, with at least one reinforcing stop 73 in the edge region bounding the positioning means and adjoining the material cutout 72. Preferably, the reinforcing stop 73 is formed by a weld seam, bond seam or rivets or the like. As depicted exclusively in FIGS. 3a and 6, one weld seam each is provided in the mentioned edge region on both sides of the shaping 71 having in particular a U-shaped design. Due to the weld seams, the material becomes more rigid and they reinforce the material in the mentioned edge region. The weld seams are for example line welds or spot welds and thus form reinforcing stops 73. Otherwise, only a continuous weld seam could be provided in the mentioned edge region, which weld seam has an essentially U-shaped design and is adapted to the outer contour of the particularly U-shaped shaping 71.

If a shifting of the rear wall 31 relative to the rear wall 60 can barely be prevented, the shifting is in any case limited by the positioning means. This may be the case, for example when the article container 2 is being loaded or unloaded. Specifically, the edge region (with or without the reinforcing stop 73) of the second rear wall section 45b adjoining the material cutout 72 may be placed against the positioning means.

FIGS. 6a, 6b show an embodiment, according to which the second rear wall section 45b is provided circumferentially with at least one reinforcing stop in the edge region bounding the positioning means and adjoining the material cutout 72. The reinforcing stop is referenced with 73' and preferably comprises a first reinforcing stop half and a second reinforcing stop half, which are permanently joined. For example, the first reinforcing stop half and second reinforcing stop half are joined via coupling elements 85 cooperating in a positively locking and/or force-fitting manner or via a material bonded connection. In the embodiment shown, the coupling elements 85 are formed by a latching connection between the first reinforcing stop half and second reinforcing stop half. Due to the reinforcing stop 73' being formed of two halves, a simpler installation on the rear cross strut 63 is possible.

According to this exemplary embodiment, the reinforcing stop 73' comprises a first bearing section 86a and a second bearing section 86b, wherein the rear cross strut 63 is borne, with a first strut section 87a, in the first bearing section 86a, and with a second strut section 87b in the second bearing section 86b. The first bearing section 86a and second bearing section 86b are arranged coaxially and have a common axis. The first strut section 87a and first bearing section 86a are arranged coaxially. The second strut section 87b and second bearing section 86b are arranged coaxially.

According to this exemplary embodiment, the reinforcing stop 73' comprises a material cutout 88 between the first bearing section 86a and the second bearing section 86b, inside which material cutout 88 the positioning means (specifically the shaping 71) is arranged. The reinforcing stop 73' shown is designed to be approximately U-shaped.

As described already in FIG. 6, the rear cross strut 63 may be provided with an (optional) positioning means according to this embodiment, as well. Preferably, the positioning means is arranged about halfway between the longitudinal struts 64. The positioning means is, for example, a shaping 71, which preferably has a U-shaped design. Instead of the shaping 71, a stop body, which is fixedly connected to the rear cross strut 63, may be provided on the rear cross strut 63 as a positioning means. The stop body is, for example, a plastic disc.

It may also prove advantageous if the first reinforcing stop half and the second reinforcing stop half form fixing pins 89 and delimiting webs 90 projecting on their inner surfaces facing one another. The fixing pins 89 of the first reinforcing stop half and the fixing pins 89 of the second reinforcing stop half are arranged distributed across the inner surfaces and offset to each other. Located opposite the fixing pins 89 of the first reinforcing stop half are bores/recesses 91 in the second reinforcing stop half. Preferably, each fixing pin 89 has a point which can penetrate the material of the rear wall 31 and/or can pierce the material. The delimiting webs 90 are provided along an arrangement line adapted to the material cutout 72 in the second rear wall section 45b and form a stop edge facing the material cutout 72, as depicted in FIG. 6b.

In general, the fixing pins 89 may also be provided on one of the inner surfaces facing one another of the first reinforcing stop half and second reinforcing stop half. Likewise, the delimiting webs 90 may also be provided on one of the inner surfaces facing one another of the first reinforcing stop half and second reinforcing stop half.

Also according to this embodiment, the rear wall 31 forms a material cutout 72 on the second rear wall section 45b, which material cutout 72 is penetrated by the positioning means (specifically the shaping 71) but does not immediately border on the positioning means.

The rear wall 31 is inserted between the first rear wall half and second reinforcing stop half with a material section (edge region) adjoining the material cutout 72. In doing so, the material cutout 72 may be positioned against the delimiting webs 90. The delimiting webs 90 prevent that the material section projects out of the contour of the material cutout 88 in the reinforcing stop 73'. If the first reinforcing stop half and second reinforcing stop half are connected to each other by means of the cooperating coupling elements 85, the fixing pins 89 become effective and fix the material section (edge region) in place relative to the reinforcing stop 73'.

The positioning means and the reinforcing stop 73' cooperate such that an undesired shifting of the rear wall 31 relative to the frame 60 is limited or prevented, and a centering of the rear wall 31 relative to the frame 60 is achieved. In particular, a shifting motion of the reinforcing stop 73' relative to the frame 60 is limited by the positioning means (specifically the shaping 71).

FIGS. 2a, 3a and 3b show a bag body in its transport position, in which the first rear wall section 45a forms a transport rest 75 extending between the first side edge 32a and second side edge 32b, which transport rest 75 comprises a transport rest surface 76 slanting in the direction of the side wall stop 46 (thus extending inclined downwards). The transport rest surface 76 adjoins the side wall stop 46.

The transport rest surface 76 and/or transport rest 75 slanting in the direction of the side wall stop 46 is preferably formed continuously between the first side edge 32a and second side edge 32b. Specifically, the transport rest 75 extends between the side wall stop 46 and the first side edge 32a, and the transport rest surface 76 opens into the loading and/or unloading opening 34.

FIGS. 4a, 4b and 4c show the article container 2 (hanging bag) with a second embodiment of a bag body. FIG. 4a shows the transport position, FIG. 4b (top view) and FIG. 4c (perspective view) show one of the opened states, which relates to the loading position if the article container 2 is to be loaded, or to the unloading position if the article container 2 is to be unloaded.

The article container 2 according to FIGS. 4a, 4b and 4c is different from the first embodiment in that the bag body comprises a guide wall 77 described below. FIG. 4c shows a bag body in its loading and/or unloading position, in which the first rear wall section 45a forms a guide wall 77 (hatched first part of the wall section) extending between the first side edge 32a and second side edge 32b and projecting upwards relative to the base plate 36 (base structure). The guide wall 77 comprises in a first part of the wall section a guide wall surface 78 tapering in the direction of the loading and/or unloading opening 34. The guide wall surface 78 is essentially flat. This means that, in the loading and/or unloading position, a (rear) opening width between the second front wall section 35b and the first rear wall section 45a on the second side edge 32b is greater in size than a (front) opening width between the second front wall section 35b and the first rear wall section 45a on the first side edge 32a.

The side wall stop 46 is connected, in particular sewn or bonded, to the first rear wall section 45a, second rear wall section 45b and first front wall section 35a, such that, in the loading and/or unloading position, the first rear wall section 45a forms a folding edge 79 extending from the second side edge 32b (and/or side wall stop 46) in the direction toward the first side edge 32a, which folding edge 79 divides the first rear wall section 45a in the (hatched) first part of the wall section and the (not hatched) second part of the wall section. The longitudinal edge 36a, folding edge 79, the first side edge 32a and second side edge 32b (and/or side wall stop 46) span between them the (not hatched) second part of the wall section. The second part of the wall section extends in the vicinity of the base plate 36 (base structure) and a plane extending essentially in parallel to the base plate 36 (base structure).

FIG. 4d shows the article container 2 (hanging bag) with a third embodiment of a bag body in one of the opened states, which relates to the loading position if the article container 2 is to be loaded, or to the unloading position if the article container 2 is to be unloaded.

The article container 2 according to FIG. 4d is different from the first embodiment in that the bag body comprises a guide wall 77 described below.

FIG. 4d shows a bag body in its loading and/or unloading position, in which the first rear wall section 45a forms a guide wall 77 extending between the first side edge 32a and second side edge 32b and projecting upwards relative to the base plate 36 (base structure). The guide wall 77 comprises (in a part of the wall section) a guide wall surface 78 tapering in the direction of the loading and/or unloading opening 34. This means that, in the loading and/or unloading position, a (rear) opening width between the second front wall section 35*b* and the first rear wall section 45*a* on the second side edge 32*b* is greater in size than a (front) opening width between the second front wall section 35*b* and the first rear wall section 45*a* on the first side edge 32*a*.

According to this embodiment, a first surface line 80*a* and a second surface line 80*b* of a circular cone or frustum span between them the (hatched) guide wall surface 78. The second longitudinal edge 37*b* and first surface line 80*a* preferably extend congruently. The first rear wall section 45*a* is designed having a first radius at its (rear) cross-sectional end located closer to the second side edge 35*b* and having a second radius at its (front) cross-sectional end located closer to the first side edge 35*a*, wherein the first radius is greater in size than the second.

The side wall stop 46 is connected, in particular sewn or bonded, to the first rear wall section 45*a*, second rear wall section 45*b* and first front wall section 35*a*, such that, in the loading and/or unloading position, the first rear wall section 45*a* forms the described guide wall surface 78.

The guide wall surface 78 and/or guide wall 77 tapering in the direction of the loading and/or unloading opening 34 is preferably formed continuously between the first side edge 32*a* and second side edge 32*b*. Specifically, the guide wall 77 extends between the side wall stop 46 and the first side edge 32*a*, and the guide wall surface 78 opens into the loading and/or unloading opening 34.

An embodiment is possible, according to which the first rear wall section 45*a* forms the guide wall 77 extending between the first side edge 32*a* and second side edge 32*b* and projecting upwards relative to the base plate (base structure), which guide wall 77 forms, in a part of the wall section, a thus designed actuation wall surface, by means of which
  the article 4 is acted upon with a first force component in the horizontal direction (H) and with a second force component (for example according to an embodiment according to FIGS. 4*a*, 4*b* and 4*c*) in the vertical direction (V), or
  the article 4 is acted upon with a first force component in the horizontal direction (H), with a second force component in the vertical direction (V), and with a third force component (for example according to an embodiment according to FIG. 4*d*) in a depth direction (T),
if the bag body is adjusted from the transport position into the unloading position.

The actuation wall surface may be formed by the guide wall surface 78 described above according to the embodiment in FIGS. 4*a*, 4*b* and 4*c* or FIG. 4*d*.

Figure 5A:
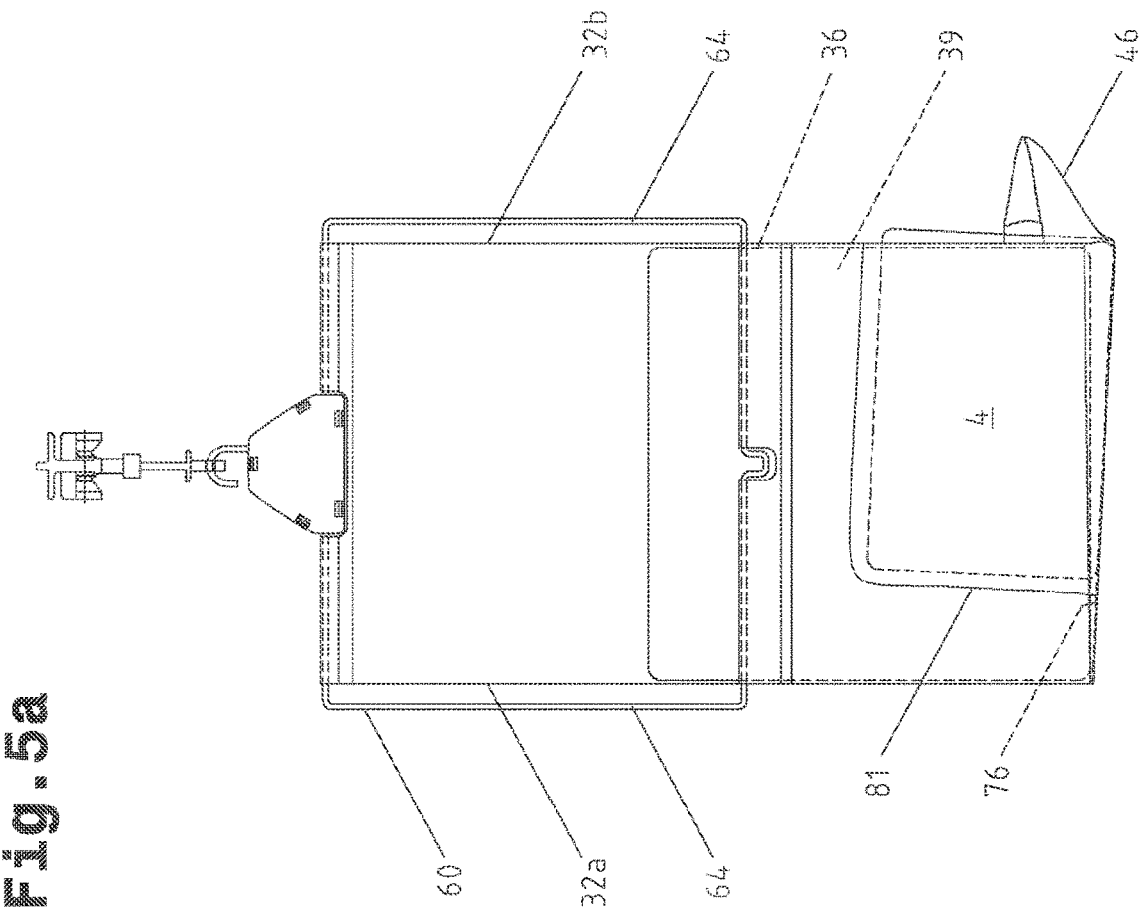

FIGS. 5*a*, 5*b* show the article container 2 (hanging bag) with a fourth embodiment of a bag body in the transport position. It also proves advantageous if, in the transport position of the bag body, the second rear wall section 45*b* forms a support wall 81, which tapers in the direction of the loading and/or unloading opening 34, between the first side edge 32*a* and second side edge 32*b*. Thereby, the article 4 can be held clamped between the base plate 36 (base structure) in the first front wall section 35*a* and the support wall 81 in the second rear wall section 45*b*. The rear wall 31 is made of flexible (non-rigid) material, so that the second rear wall section 45*b* clings closely to the article 4, in particular to the corner and edge. The article 4 is held by means of a form and friction fit.

At this point, it should be noted that each of the different embodiments of the bag body may form an independent invention on its own. To that end, it should also be noted that according to the second, third and fourth embodiment of the invention, the bag body may also form in its transport position a transport rest 75 between the first side edge 32*a* and second side edge 32*b*, which transport rest 75 comprises a transport rest surface extending essentially horizontally, as is represented in more detail.

However, it proves advantageous of the first, second, third and fourth embodiment of the bag body are combined. However, a combination of the first embodiment and only one of the second, third and fourth embodiments is also possible.

FIG. 8 shows a cutting from a material web with a view onto the inner side of the front wall 30 and rear wall 31 of a bag body, in particular according to the embodiment in FIG. 4*d* or according to an embodiment of a combination of FIG. 4*d* and FIGS. 5*a*, 5*b*.

As already described above, the front wall 30 comprises the first front wall section 35*a* and second front wall section 35*b*, wherein the base plate 36 (base structure) is provided in the first front wall section 35*a*. The base plate 36 (base structure) is designed approximately as a square. The rear wall 31 comprises the first rear wall section 45*a* and second rear wall section 45*b*, wherein the first rear wall section 45*a* adjoins the first front wall section 35*a*. The material cutouts 70, 72 are also depicted.

In the first front wall section 35*a*, the longitudinal edge sections of the longitudinal edges 32*a*, 32*b* extend in parallel and have the same length. In the second front wall section 35*b*, the longitudinal edge sections of the longitudinal edges 32*a*, 32*b* extend either in a parallel manner (solid lines) or inclined towards one another (dot-dashed lines), according to the latter embodiment, the second front wall section 35*b* tapers with increasing distance from the front wall section 35*a*. The longitudinal edges 32*a*, 32*b* have the same length.

In the first rear wall section 45*a*, the longitudinal edge sections of the longitudinal edges 32*a*, 32*b* have different lengths. Specifically, the length of a first longitudinal edge section on the first longitudinal edge 32*a* in the first rear wall section 45*a* is approximately zero or is zero. In any case, a second longitudinal edge section on the second longitudinal edge 32*b* is longer than the first longitudinal edge section on the first longitudinal edge 32*a*.

In the second rear wall section 45*a*, the longitudinal edge sections of the longitudinal edges 32*a*, 32*b* extend in parallel and have different lengths. Specifically, the length of the first longitudinal edge section on the first longitudinal edge 32*a* on the first side (near the loading and/or unloading opening) is smaller in size than the length of the second longitudinal edge section on the second longitudinal edge 32*b* on the second side (near the side wall stop 46). The second rear wall section 45*a* extends at an angle relative to the first front wall section 35*a*.

The side wall stop 46 is especially cut from a separate material web and joined with the at least one material cutting for the front wall 30 and rear wall 31, in particular sewn to the front wall section 35*a*, first rear wall section 45*a* and second rear wall section 45*b*.

As schematically adumbrated in dashed lines in FIG. 8, an inner contour of the frame 60 is adapted to an outer contour of the base plate 36 (base structure) such that the base plate 36 (base structure) can be threaded through the frame 60 in an essentially undeformed condition if the bag body is adjusted into the loading and/or unloading position by means of the frame 60. The bag body can be turned inside out, so that the inner side of the bag body becomes the outer side of the bag body. The article container 2 can still be used in the same manner, it is only to be hung on the overhead conveying device rotated by 180°. In this regard, it may prove advantageous if the first front wall section 35*a* has different material properties, preferably friction coefficients, on the inner side of the bag body and on the outer side of the bag body. This is given, for example, when the base plate 36 (base structure) is provided in the first front wall section 35*a*, which base plate 36 faces the inner side of the bag body, while the outer side does not provide a base plate 36 in the first front wall section 35*a*. The material property in the first front wall section 35*a* is then determined by the flexible (non-rigid) material used.

Figure 9:
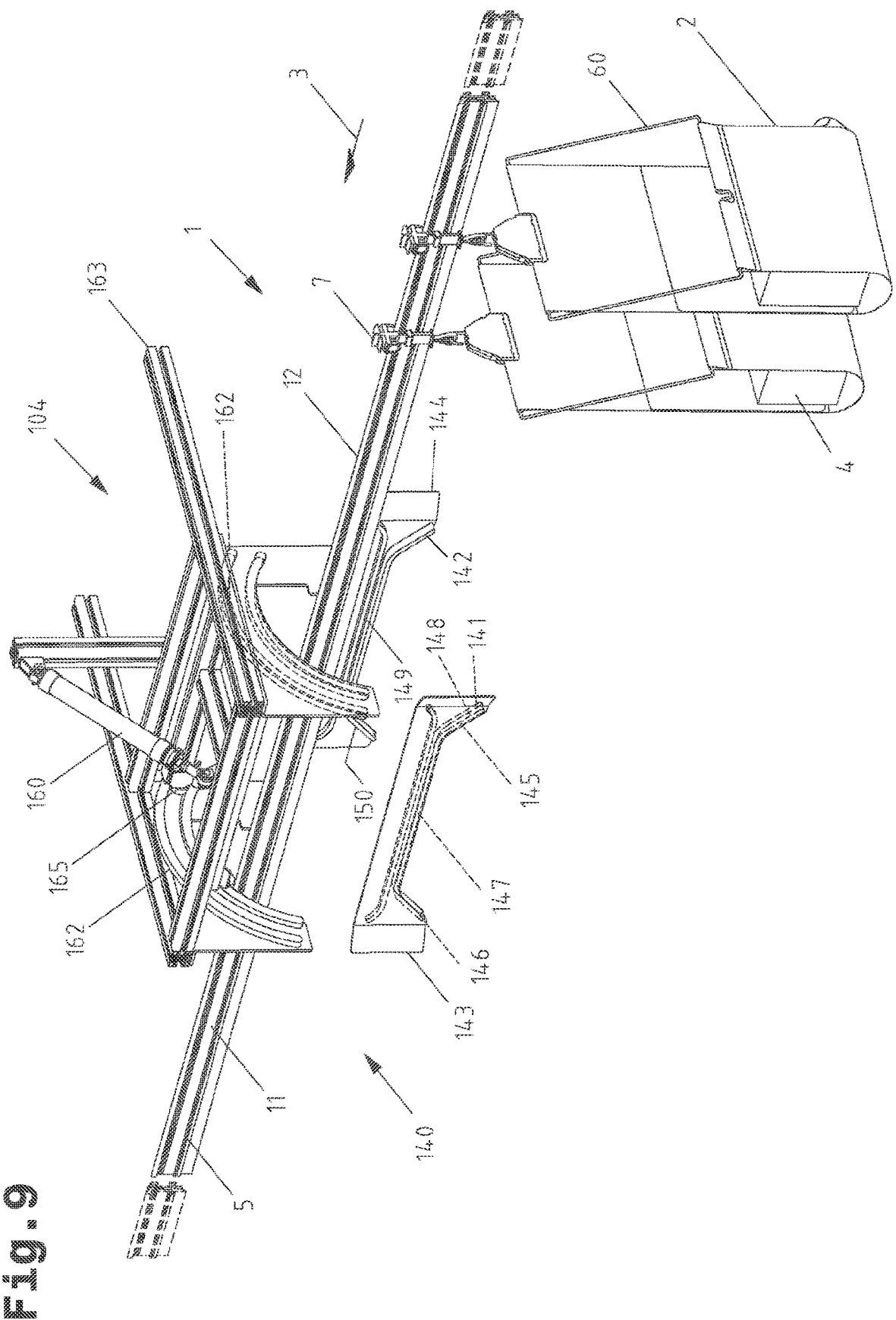
FIGS. 9 to 15 a sequence order of method steps for automated unloading of one of the article containers in an automated unloading station, in perspective views.
Figure 16A:
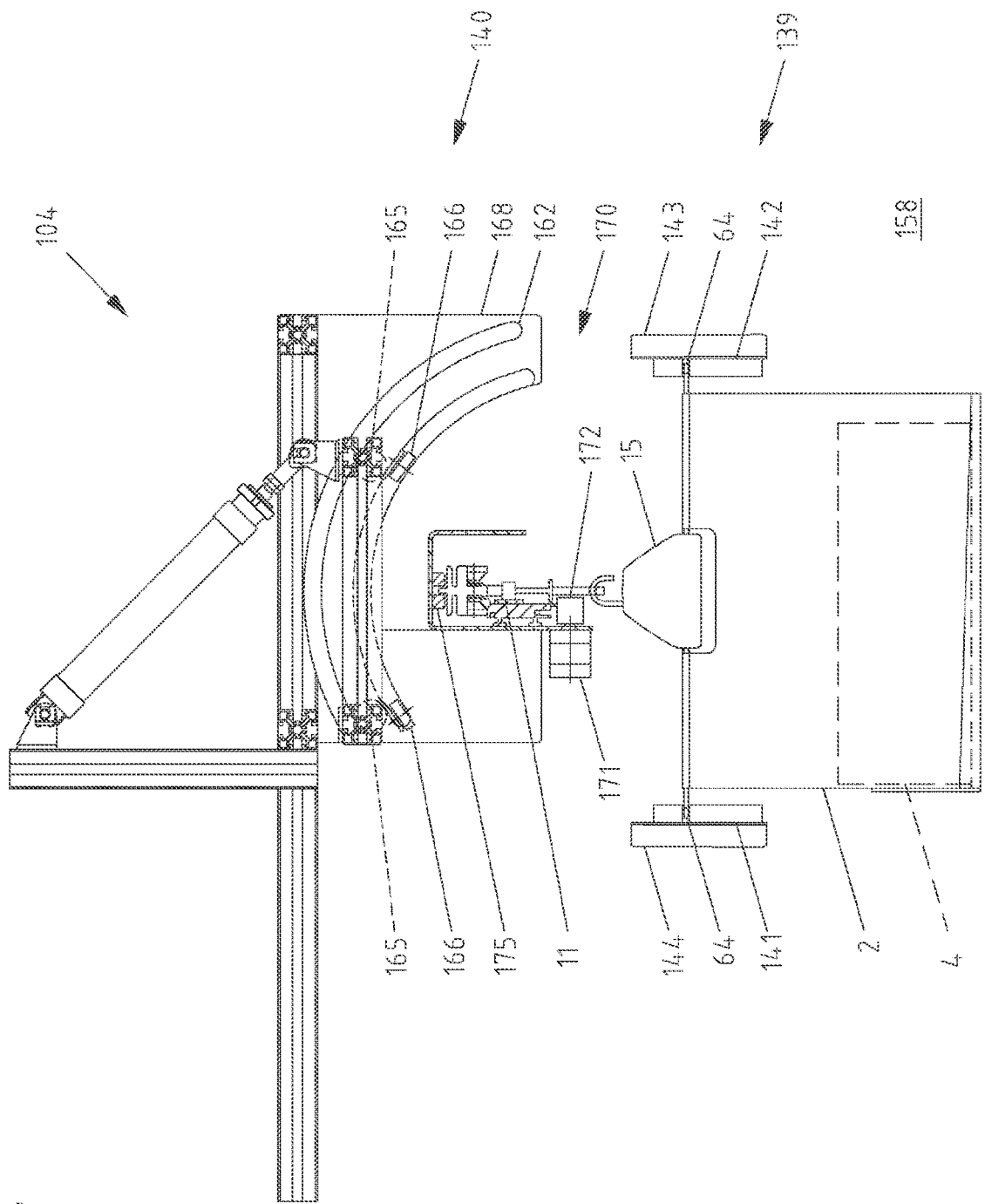
FIG. 16a a view onto the unloading device and a schematically shown article container according to FIG. 11, said article container being in a provisioning position, partially in a sectional view.

FIGS. 9, 16*a* and 16*b* show the unloading station 104 in different views. It comprises the overhead conveying device 1 for transporting the article container 2 to the unloading station 104 and for transporting the article container 2 away from the unloading station 104, an opening and closing device 139 for adjusting the bag body between the transport position and the loading and/or unloading position, and an unloading device 140 for unloading the bag body adjusted into the opened state.

The opening and closing device 139 comprises an actuation device for automatic opening and closing of the bag body, by means of which actuation device the frame 60 can be pivoted about the axis 61 relative to the suspended support 15 such that the bag body can be adjusted between the transport position and the loading and/or unloading position.

According to a possible embodiment, the actuation device comprises a driver mechanism for automated opening and closing of the bag body. The driver mechanism preferably comprises a first driver mechanism 141 and a second driver mechanism 142 which are arranged on both sides and below the overhead conveying device 1 for transporting the article container 2 to the unloading station 104 and transporting the article container 2 away from the unloading station 104. In particular, the first driver mechanism 141 and the second driver mechanism 142 are arranged symmetrically to one another with respect to the article container 2, in particular the frame 60. However, in general, only one of the driver mechanisms 141 can be provided.

The first driver mechanism 141 is affixed to a first support frame 143 and the second driver mechanism 142 is affixed to a second support frame 144. The first support frame 143 and the second support frame 144 are parts of the actuation device.

In the shown exemplary embodiment, the first driver mechanism 141 comprises a lower guide assembly and an upper guide assembly, the second driver mechanism 142 also comprises a lower guide assembly and an upper guide assembly. The lower guide assembly and the upper guide assembly are arranged on top of one another at a distance such that between the lower guide assembly and the upper guide assembly of the first driver mechanism 141 and between the lower guide assembly and the upper guide assembly of the second driver mechanism 142, in each case, one of the longitudinal struts 64 can be accommodated. The distance essentially corresponds to the diameter of the longitudinal strut 64. However, the first driver mechanism 141 and/or the second driver mechanism 142 can also comprise just the lower guide track.

The lower guide assembly and, if provided, the upper guide assembly of the first driver mechanism 141 and, if provided, of the second driver mechanism 142 comprise an inlet section 145 located upstream of the article container 2 in the transport direction 3, an outlet section 146 located downstream thereof, and an unloading section 147 located between the inlet section 145 and the outlet section 146. The lower guide assembly and, if provided, the upper guide assembly of the first driver mechanism 141 and/or of the second driver mechanism 142 extend in parallel to the transport direction 3 of the article container 2.

Figure 10:
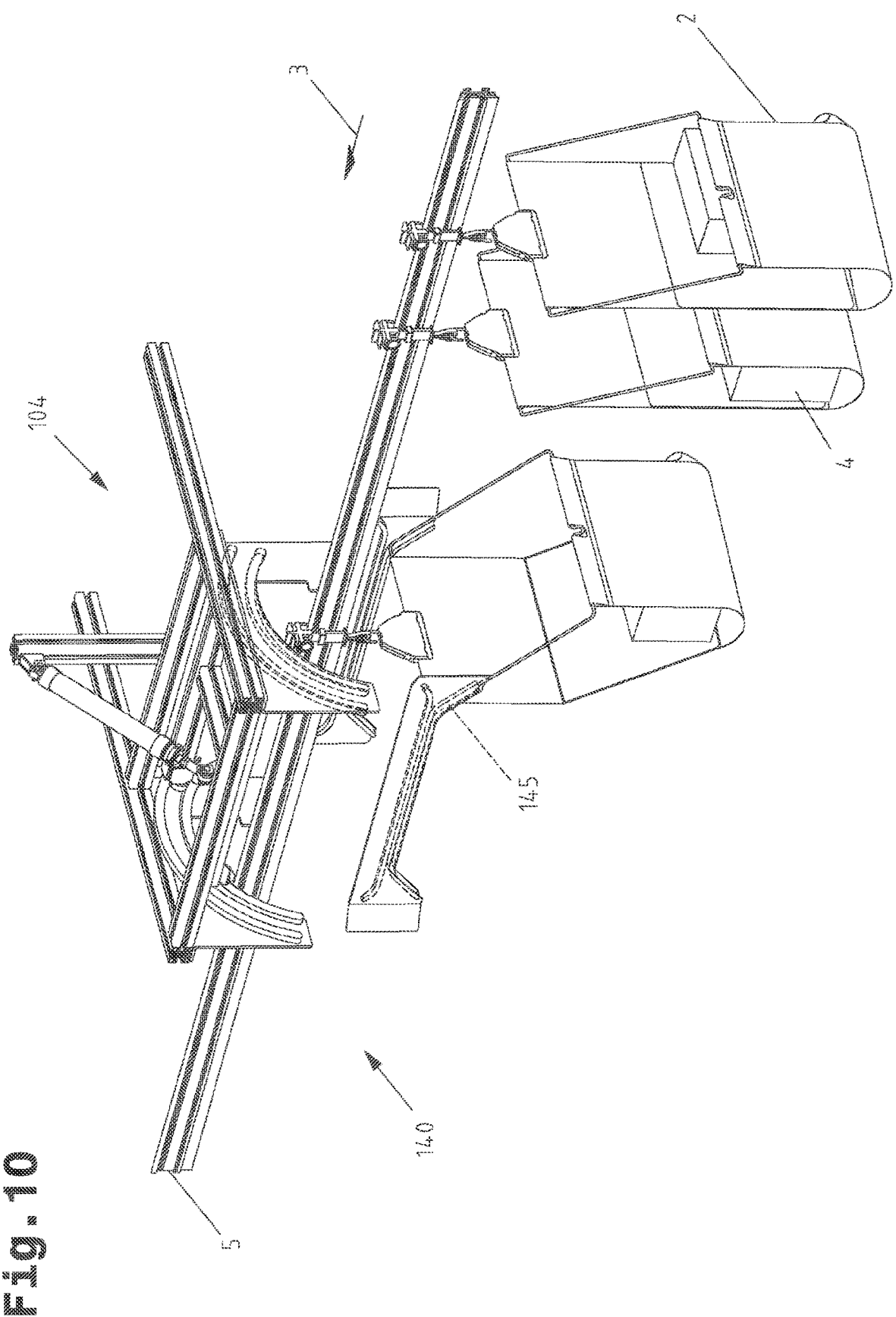

The inlet section 145 forms a tilted guide track 148 that can be brought into an abutting contact with the frame 60, in particular the longitudinal struts 64, such that the frame 60 is pivoted during transport of the article container 2 to the unloading station 104, whereby the bag body is adjusted from the transport position in the direction of the loading and/or unloading position (FIG. 10).

Figure 11:
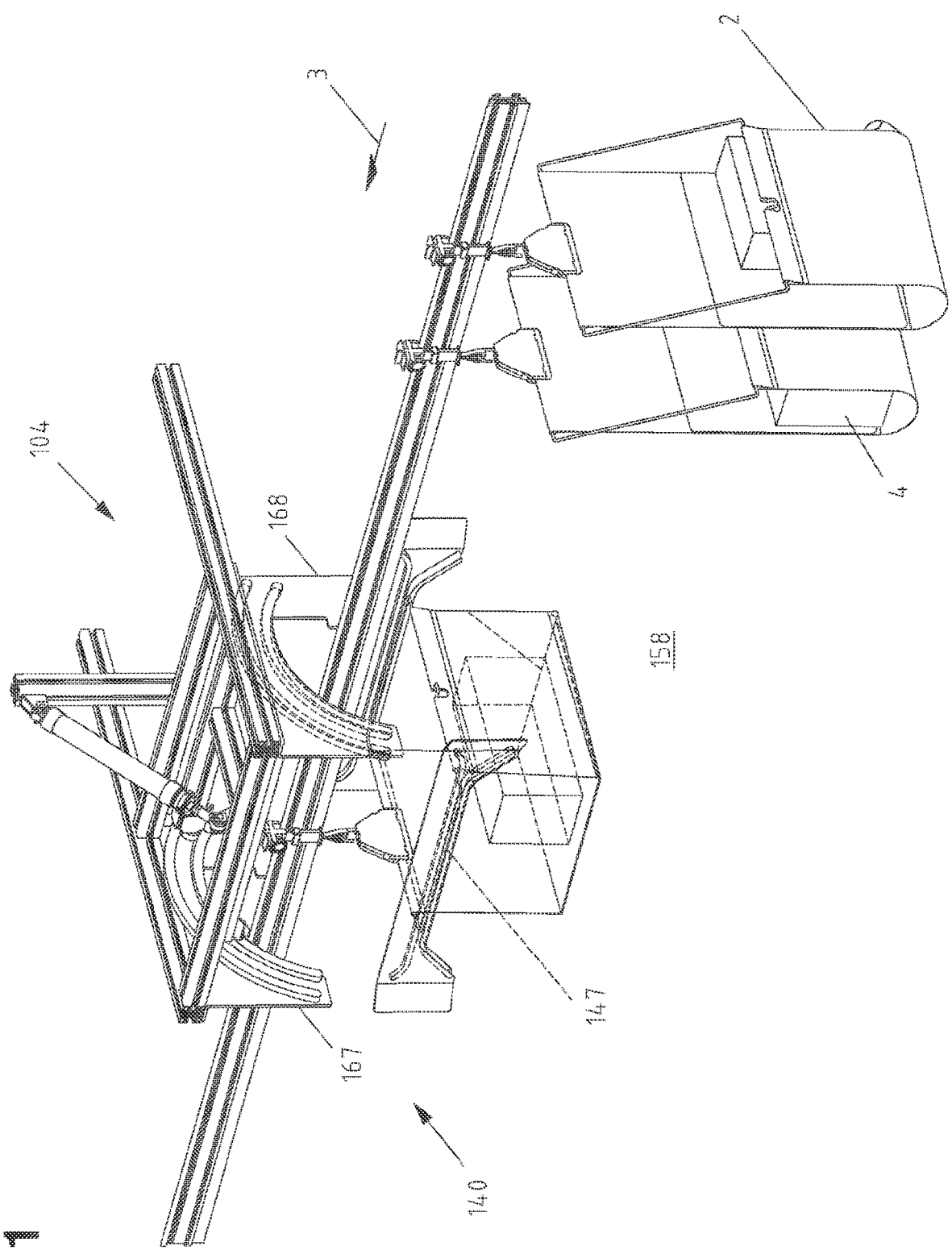

The unloading section 147 forms a guide track 149 which is essentially horizontal and which can be brought into an abutting contact with the frame 60, in particular the longitudinal struts 64, such that the frame 60 is held in the pivoted deflection position during the unloading operation whereby the bag body also remains in the opened state (FIG. 11).

Figure 14:
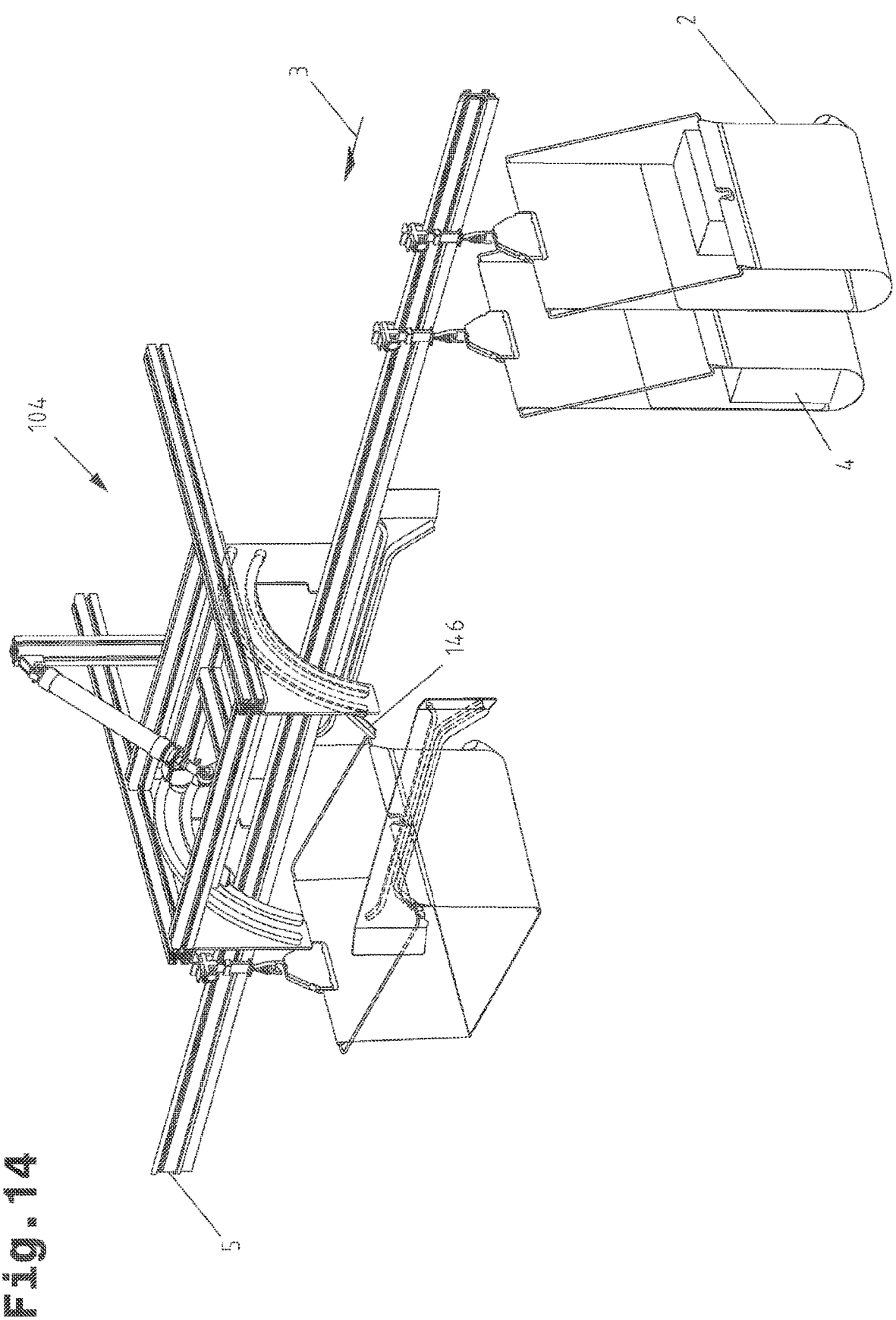
Figure 15:
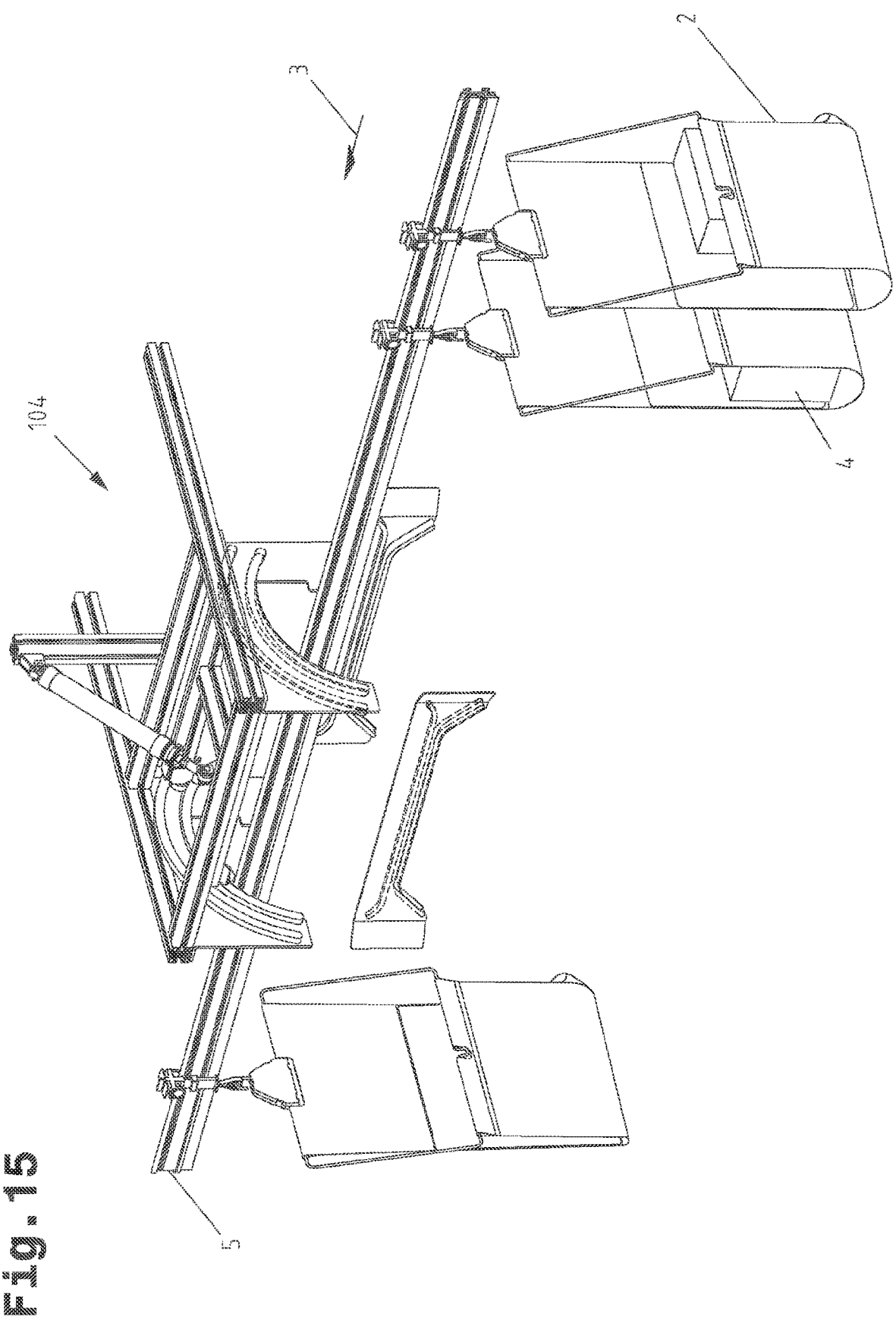

The outlet section 146 forms a tilted guide track 150 that can be brought into an abutting contact with the frame 60, in particular the longitudinal struts 64, such that the frame 60 is pivoted during transport of the article container 2 away from the unloading station 104, whereby the bag body is adjusted from the loading and/or unloading position in the direction of the transport position (FIG. 14).

As can be seen in the Figures, the unloading device 140 comprises an actuation device 156, by means of which the article container 2 along with the bag body can be tilted about a tilting axis 157 extending essentially in parallel to the longitudinal extension of the overhead conveying device 1 between a provisioning position 158 (FIGS. 11, 16*a*) and an unloading position 159 (FIGS. 12, 16*b*), wherein in the unloading position 159, the article 4 can be discharged from the article container 2 through the loading and/or unloading opening 34. The articles 4 are preferably loaded into a container not depicted or on a conveying device not depicted, for example a belt conveyor. This container can also represent the shipping cardboard box.

Figure 12:
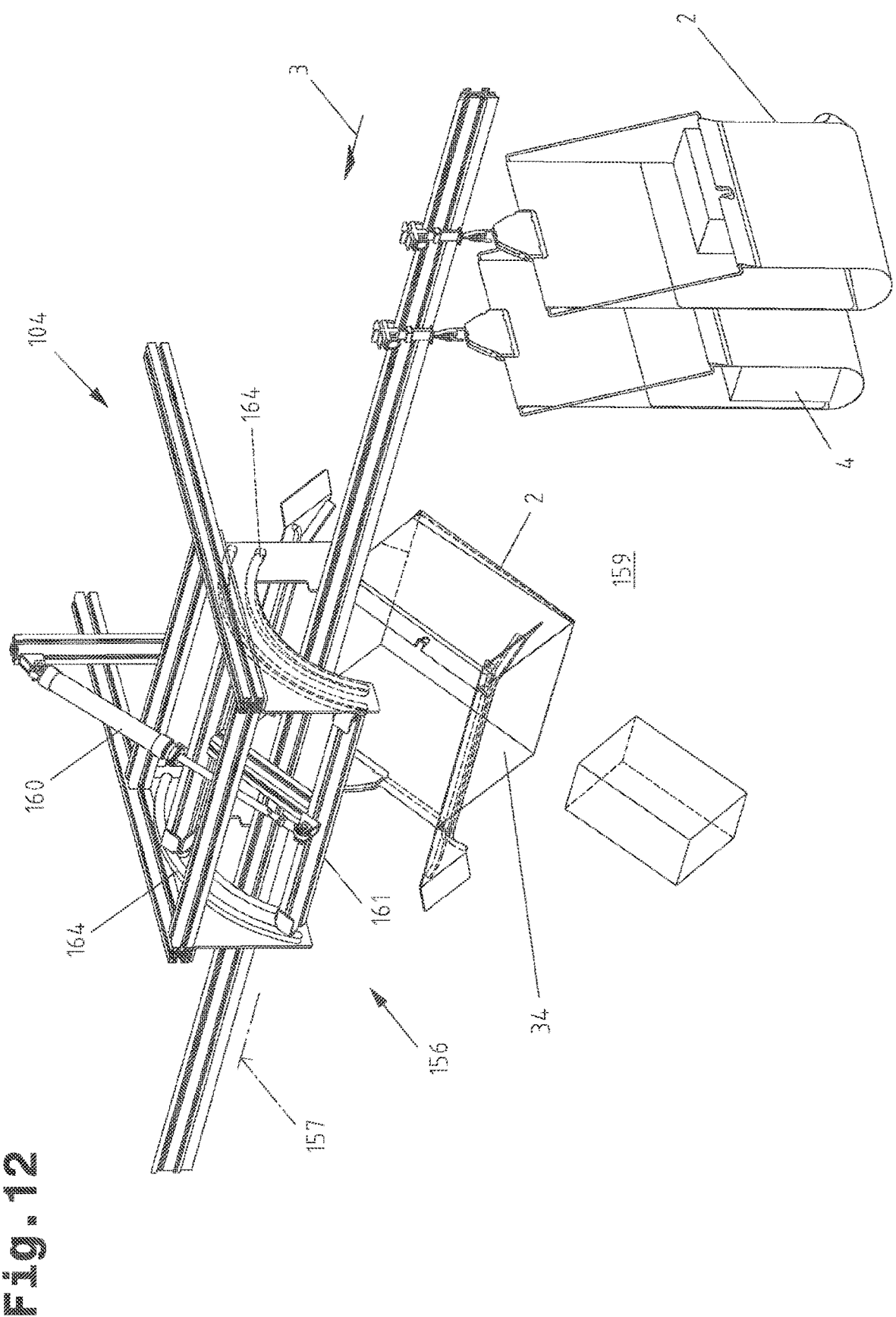
Figure 13:
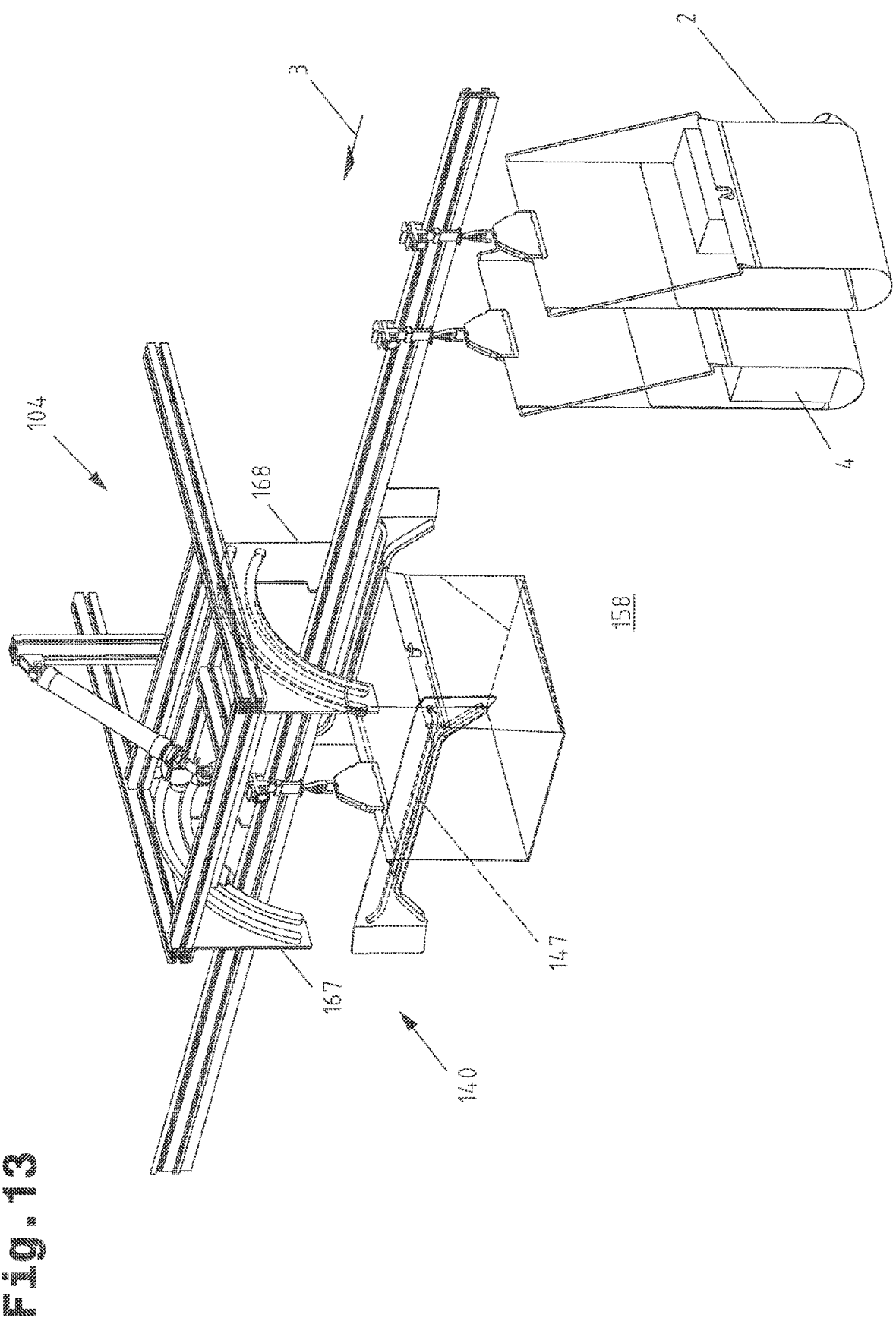

In a preferred first embodiment, the article container 2, along with the bag body adjusted into the opened state (unloading position), is tilted about the tilting axis 157 between a provisioning position 158 (FIGS. 11, 16*a*) and a unloading position 159 (FIGS. 12, 16*b*). In other words, the bag body is adjusted into the unloading position in a precursory first step i) before the unloading—the article container 2 is now in the provisioning position 158, and in a subsequent second step ii), the article container 2, along with the bag body adjusted into the unloading position, is pivoted about the tilting axis 157—the article container 2 is now in the unloading position 159.

After the unloading, the article container 2, along with the bag body adjusted into the unloading position, is tilted back from the unloading position 159 (FIGS. 12, 16*b*) into the provisioning position 158 (FIG. 11, 16*a*) about the tilting axis 157. Afterwards, the article container 2 is transported away by means of the overhead conveying device 1.

According to a second embodiment, the article container 2 is tilted, still during the adjustment movement of the bag body between the transport position and the unloading position, about the tilting axis 157 between the provisioning position 158 and the unloading position 159. In other words, for unloading, the article container 2 is tilted from the provisioning position 158 into the unloading position 159 about the tilting axis 157, still during the opening operation of the bag body from the transport position in the direction of the unloading position. Likewise, the article container 2 can be tilted from the unloading position 159 into the provisioning position 158 about the tilting axis 157 after unloading and during the closing operation of the bag body from the unloading position in the direction of the transport position.

The actuation device 156 of the unloading device 140 comprises a frame structure 161 which can be tilted by means of a drive 160 between an initial position and an actuation position about an axis extending in parallel to the transport direction 3 of the article containers 2. The drive 160 is for example a fluid cylinder.

In the depicted embodiment, the frame structure 161 is mounted on a stationary support construction 163 via guide assemblies 162. Each of the guide assemblies 162 comprises a guide track 164 and guide rollers 165, 166 (FIGS. 9, 16a) which rest thereon in a rollable manner. The guide tracks comprise the (left) first guide track 164 and the (right) second guide track 164. The first guide track 164 is affixed to a first support frame 167 and the second guide track 164 to a second support frame 168. The frame structure 161 has frame sides opposing one another, wherein the guide rollers 165, 166 are arranged on the first frame side and the guide rollers 165, 166 are arranged on the second frame side.

As is shown in dashed lines exclusively in FIG. 16b for reasons of clarity, the actuation device of the opening and closing device 139 is mounted on the tiltable frame structure 161.

Specifically, the first driver mechanism 141 with the first support frame 143 and the second driver mechanism 142 with the second support frame 144 1 is affixed to the frame structure 161 via frame connections 169

Hence, the opening and closing device 139 is tilted together with the frame structure 161, and the article container 2 is held essentially fixed also in the unloading position 159 (between the lower guide assembly and the upper guide assembly of the first driver mechanism 141 and, if available, between the lower guide assembly and the upper guide assembly of the second driver mechanism 144, one of the longitudinal struts 64 each).

In FIGS. 16a, 16b, the unloading station 104 is shown with the opening and closing device 139. In FIG. 16a, the article container 2 is in the provisioning position 158 and the bag body in its unloading position and/or opened state (also see FIG. 11). In FIG. 16b, the article container 2 is in the unloading position 159 and the bag body in its unloading position and/or opened state (also see FIG. 12).

According to this embodiment, the unloading station 104 additionally comprises a locking device 170 for arresting the transport carrier 7 during an unloading operation of the article container 2.

The locking device 170 comprises an arresting element 172, for arresting the transport carrier 7, movable between an ineffective initial position (16a) and an effective actuation position (FIG. 16b) by means of a drive 171. The arresting element 172 comprises, for example, a stop, against which a profile web 173 of the transport carrier 7 runs and positions the transport carrier 7 in the transport direction 3.

The unloading station 104 can further comprise a guide device 175 extending in parallel to the transport direction 3 for laterally guiding the transport carrier 7 during a transport movement of the transport carrier 7 through the overhead conveying device 1 for transporting the article container 2 to the unloading station 104 and transporting the article container 2 away from the unloading station 104. Moreover, the guide device 175 is effective during the unloading operation and when the article container 2 is tilted between the provisioning position 158 and unloading position 159 about the tilting axis 157, by means of the transport carrier 7 being fixed against a lateral movement (transversely with respect to the transport direction 3) and/or a lateral movement (transversely with respect to the transport direction 3) being limited.

The method for unloading an article 4 from an article container 2 is described in AT 2018/50320 is made the subject matter of this disclosure.

Even though the article container 2 described above is particularly suitable for automatic loading and automatic unloading, it is equally possible to load the article container 2 manually and to unload it manually. Manual loading and automatic unloading or vice versa is also possible.

It should also be pointed out that the article container 2 does not necessarily have to comprise a frame 60 and in particular a "circumferential" frame 60. The suspended support 15, the overhead conveying device 1, the loading station and/or unloading station may also be designed according to a different embodiment, as described, for example, in WO 2016/120031 A1. According to this embodiment, the article container 2 comprises a bag body adjustable between a transport position and a loading and/or unloading position. Instead of the frame described above, cross struts separated from each other are used, wherein the front wall is arranged on a front cross strut and the rear wall on a rear cross strut, both in an articulated manner. Longitudinal struts, which are connected to the front cross strut and rear cross strut, are not provided. Likewise, the adjustment of the bag body between a transport position and a loading and/or unloading position is carried out by actuation mechanisms arranged separate from the article container, which actuation mechanisms can cooperate with the front cross strut and/or rear cross strut. The article container disclosed in WO 2016/120031 A1 may also comprise the bag body described in the different embodiments without departing from the teaching of the inventions.

It should also be mentioned that the front wall 30 may be provided with a base plate 36 and reinforcing elements 100 in the first front wall section 35a, as schematically and exclusively depicted in FIG. 8. This modification can be applied to all of the embodiments described above for the bag body and/or article container.

If the base plate 36 (according to the first embodiment) is produced separately from the bag body, as described above, the base plate 36 is arranged in the first front wall section 35a preferably on the inside of the bag body, while the reinforcing elements 100 are arranged in the first front wall section 35a preferably on the outside of the bag body. According to the embodiment shown, the reinforcing elements 100 comprise a first receiving channel 101a extending in parallel to the first side edge 32a and a wire rod 102a inserted in it and a second receiving channel 101b extending in parallel to the second side edge 32b, and a second wire rod 102b inserted in it. The first receiving channel 101a is formed in a first textile strip, which is sewn or bonded to the bag body in the first front wall section 35a, and the second receiving channel 101b is formed in a second textile strip, which is sewn or bonded to the bag body in the first front wall section 35a. In general, however, the base plate 36 could also form the first receiving channel 101a and the second receiving channel 101b. This allows the base plate 36 to be formed in a particularly thin manner, in particular with a thickness of a maximum of 1 mm. Loading and/or unloading at an automatic loading device and/or unloading device can take place in a particularly reliable manner.

However, the reinforcing elements 100 may also be formed by a greater material thickness or higher material density, for example according to the embodiment described above, where the base plate 36 is not produced separately from the bag body. This measure also leads to a particularly dimensionally stable base plate 36.

Finally, it should also be noted that the scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

In particular, it should also be noted that the article containers 2 shown may in reality comprise more or fewer components than those shown. In some cases, the shown article containers 2 and/or their components may not be depicted to scale and/or be enlarged and/or reduced in size.

| List of reference numbers | |
|---|---|
| 1 | Overhead conveying device |
| 2 | Article container |
| 3 | Transport direction |
| 4 | Article |
| 5 | Drive device |
| 7 | Transport carrier |
| 8 | Suspended body |
| 9 | Roller |
| 10 | Friction surface |
| 11 | Friction belt |
| 12 | Profile rail |
| 15 | Suspended support |
| 16 | Axis |
| 17 | Coupling element |
| 18 | Coupling element |
| 19 | Pivotal mounting |
| 20 | Pivot bearing axle |
| 30 | Front wall |
| 31 | Rear wall |
| 32a | First side edge |
| 32b | Second side edge |
| 34 | Loading and/or unloading opening |
| 35a | First front wall section |
| 35b | Second front wall section |
| 36 | Base plate (base structure) |
| 37a | First longitudinal edge |
| 37b | Second longitudinal edge |
| 38a | First end edge |
| 38b | Second end edge |
| 39 | Support and rest surface |
| 45a | First rear wall section |
| 45b | Second rear wall section |
| 46 | Side wall stop |
| 47 | Material cutout |
| 60 | Frame |
| 61 | Axis |
| 63 | Cross strut |
| 64 | Longitudinal strut |
| 65a | First strut section |
| 65b | Second strut section |
| 66a | First strut shank |
| 66b | Second strut shank |
| 67a | First strut head |
| 67b | Second strut head |
| 68a | First bearing section |
| 68b | Second bearing section |
| 69a | First strut head receptacle |
| 69b | Second strut head receptacle |
| 70 | Material cutout |
| 71 | Positioning means |
| 72 | Material cutout |
| 73 | Reinforcing stop |
| 75 | Transport rest |
| 76 | Transport rest surface |
| 77 | Guide wall |
| 78 | Guide wall surface |
| 79 | Folding edge |

-continued

| List of reference numbers | |
|---|---|
| 80a, 80b | Surface line |
| 81 | Support wall |
| 85 | Coupling element |
| 86a | First bearing section |
| 86b | Second bearing section |
| 87a | First strut section |
| 87b | Second strut section |
| 88 | Material cutout |
| 89 | Fixing pin |
| 90 | Delimiting web |
| 91 | Bore/recess |
| 100 | Reinforcing element |
| 101a | First receiving channel |
| 101b | Second receiving channel |
| 102a | First wire rod |
| 102b | Second wire rod |
| 104 | Unloading station |
| 139 | Opening and closing device |
| 140 | Unloading device |
| 141 | Driver mechanism |
| 142 | Driver mechanism |
| 143 | Support frame |
| 144 | Support frame |
| 145 | Inlet section |
| 146 | Outlet section |
| 147 | Unloading section |
| 148 | Guide track |
| 149 | Guide track |
| 150 | Guide track |
| 156 | Actuation device of the unloading device |
| 157 | Tilting axis |
| 158 | Provisioning position |
| 159 | Unloading position |
| 160 | Drive |
| 161 | Frame structure |
| 162 | Guide assembly |
| 163 | Support construction |
| 164 | Guide track |
| 165 | Guide roller |
| 166 | Guide roller |
| 167 | Support frame |
| 168 | Support frame |
| 169 | Frame connection |
| 170 | Locking device |
| 171 | Drive |
| 172 | Arresting element |
| 173 | Profile web |
| 175 | Guide device |

The invention claimed is:

1. An article container for an overhead conveying device for transporting an article, comprising
   a bag body that is adjustable between a transport position and a loading and/or unloading position,
   a suspended support for suspended transport of the article container on the overhead conveying device, and
   a frame, by means of which the bag body is suspended on the suspended support and by means of which the bag body can be adjusted between the transport position and the loading and/or unloading position,
   wherein the frame comprises
   cross struts, or
   cross struts and longitudinal struts connected thereto, a rear cross strut having a positioning means,
   which wherein the bag body comprises
   a front wall and a rear wall made from a flexible material,
   a first side edge and a second side edge along the front wall and rear wall,
   a loading and/or unloading opening formed on a first side of the bag body at least in some regions between the front wall and the rear wall, and a side wall stop formed on a second side of the bag body at least in some regions between the front wall and the rear wall, and the article is placeable against the side wall stop, wherein the front wall
comprises a first front wall section and a second front wall section, and
is provided with a base plate in the first front wall section, the base plate comprising
a first longitudinal edge,
a second longitudinal edge extending at a distance from the first longitudinal edge,
a first end edge extending between the first longitudinal edge and the second longitudinal edge, and
a second end edge extending between the first longitudinal edge and the second longitudinal edge,
wherein the base plate adjoins the first side edge with the first end edge and adjoins the second side edge with the second end edge, and
is provided with a material cutout in the second front wall section, the material cutout is being penetrated by the suspended support, wherein the rear wall
comprises a first rear wall section and a second rear wall section,
adjoins the first front wall section with the first rear wall section,
has a lower rigidity in the first rear wall section than in the first front wall section, and
is provided with a material cutout in the second rear wall section, the material cutout being penetrated by the positioning means, wherein in the transport position of the bag body
the article is accommodated between the front wall and the rear wall, and
the first rear wall section forms a transport rest between the first side edge and the second side edge, the transport rest forming a transport rest surface sloping in the direction of the side wall stop, wherein in the loading and/or unloading position of the bag body
the loading and/or loading opening is delimited by the front wall and the rear wall and adjoins the first end edge of the base plate, and wherein
the front wall is mounted, with the second front wall section, on a front cross strut of the cross struts, and the rear wall is mounted, with the second rear wall section, on the rear cross strut of the cross struts.

2. The article container according to claim 1, wherein the transport rest is formed continuously between the first side edge and the second side edge.

3. The article container according to claim 1, wherein, in the transport position of the bag body, the second rear wall section forms a support wall, which tapers in the direction of the loading and/or unloading opening, between the first side edge and the second side edge, so that the article is held clamped between the base plate in the first front wall section and the support wall in the second rear wall section.

4. The article container according to claim 1, wherein, in the loading and/or unloading position of the bag body, the first rear wall section further comprises a guide wall, which protrudes beyond the base plate, between the first side edge and the second side edge, wherein the guide wall forms a guide wall surface tapering in the direction of the loading and/or unloading opening.

5. The article container according to claim 4, wherein the guide wall is formed continuously between the first side edge and the second side edge.

6. The article container according to claim 1, wherein the first rear wall section of the bag body forms a guide wall between the first side edge and the second side edge, wherein the guide wall forms an actuation wall surface, by means of which
the article is acted upon with a first force component in the horizontal direction and with a second force component in the vertical direction, or
the article is acted upon with a first force component in the horizontal direction, with a second force component in the vertical direction, and with a third force component in a depth direction
if the bag body is adjusted from the transport position into the unloading state position.

7. The article container according to claim 1, wherein the frame is mounted so as to be pivotable relative to the suspended support about an axis.

8. The article container according to claim 1, wherein the front cross strut comprises a first strut shank and a second strut shank, which protrude separately from each other, orthogonally on the longitudinal struts and run towards each other.

9. The article container according to claim 1, wherein the second front wall section comprises a loop formed by folding over a material end region and the front cross strut is threaded through the loop.

10. The article container according to claim 1, wherein the second rear wall section comprises a loop formed by folding over a material end region and the rear cross strut is threaded through the loop.

11. The article container according to claim 1, wherein the positioning means is formed by a shaping having a U-shaped design on the rear cross strut, wherein the shaping penetrates the material cutout.

12. The article container according to claim 1, wherein the second rear wall section is provided, in some sections or circumferentially, with at least one reinforcing stop in the edge region bounding the positioning means and bordering on the material cutout.

13. An article container for an overhead conveying device for transporting an article, comprising
a bag body that is adjustable between a transport position and a loading and/or unloading position,
a suspended support for suspended transport of the article container on the overhead conveying device, and
a frame, by means of which the bag body is suspended on the suspended support and by means of which the bag body can be adjusted between the transport position and the loading and/or unloading position,
wherein the frame comprises
cross struts, or
cross struts and longitudinal struts connected thereto,
wherein the bag body comprises
a front wall and a rear wall made from a flexible material,
a first side edge and a second side edge along the front wall and the rear wall,
a loading and/or unloading opening formed on a first side of the bag body at least in some regions between the front wall and the rear wall, and
a side wall stop formed on a second side of the bag body at least in some regions between the front wall and the rear wall, and the article is placeable against the side wall stop, wherein the front wall
  comprises a first front wall section and a second front wall section, and
  is provided with a base plate in the first front wall section, the base plate comprising
    a first longitudinal edge,
    a second longitudinal edge extending at a distance from the first longitudinal edge,
    a first end edge extending between the first longitudinal edge and the second longitudinal edge, and
    a second end edge extending between the first longitudinal edge and the second longitudinal edge,
      wherein the base plate adjoins the first side edge with the first end edge and adjoins the second side edge with the second end edge,
wherein the rear wall
  comprises a first rear wall section and a second rear wall section,
  adjoins the first front wall section with the first rear wall section, and
  has a lower rigidity in the first rear wall section than in the first front wall section,
wherein the front wall is mounted, with the second front wall section, on a front cross strut of the cross struts, and the rear wall is mounted, with the second rear wall section, on a rear cross strut of the cross struts,
wherein in the transport position of the bag body
  the article is accommodated between the front wall and the rear wall, and
  the second rear wall section forms a support wall, which tapers in the direction of the loading and/or unloading opening between the first side edge and the second side edge, so that the article is held clamped between the base plate in the first front wall section and the support wall in the second rear wall section,
and wherein in the loading and/or unloading position of the bag body
  the loading and/or unloading opening is delimited by the front wall and the rear wall and adjoins the first end edge of the base plate.

14. The article container according to claim 13, wherein in the transport position of the bag body
  the first rear wall section forms a transport rest, wherein the transport rest comprises a transport rest surface sloping in the direction of the side wall stop and extends continuously between the first side edge and the second side edge.

15. An article container for an overhead conveying device for transporting an article, comprising
  a bag body that is adjustable between a transport position and a loading and/or unloading position,
  a suspended support for suspended transport of the article container on the overhead conveying device, and
  a frame, by means of which the bag body is suspended on the suspended support and by means of which the bag body can be adjusted between the transport position and the loading and/or unloading position,
wherein the frame comprises
  cross struts, or
  cross struts and longitudinal struts connected thereto, a rear cross strut having a positioning means,
wherein the bag body comprises
  a front wall and a rear wall made from a flexible material,
  a first side edge and a second side edge along the front wall and the rear wall,
  a loading and/or unloading opening formed on a first side of the bag body at least in some regions between the front wall and the rear wall, and
  a side wall stop formed on a second side of the bag body at least in some regions between the front wall and the rear wall, and the article is placeable against the side wall stop,
wherein the front wall
  comprises a first front wall section and a second front wall section, and
  is provided with a base plate in the first front wall section, the base plate comprising
    a first longitudinal edge,
    a second longitudinal edge extending at a distance from the first longitudinal edge,
    a first end edge extending between the first longitudinal edge and the second longitudinal edge, and
    a second end edge extending between the first longitudinal edge and the second longitudinal edge,
      wherein the base plate adjoins the first side edge with the first end edge and on adjoins the second side edge with the second end edge, and
  is provided with a material cutout in the second front wall section, the material cutout is being penetrated by the suspended support,
wherein the rear wall
  comprises a first rear wall section and a second rear wall section,
  adjoins the first front wall section with the first rear wall section, and
  has a lower rigidity in the first rear wall section than in the first front wall section, and
  is provided with a material cutout in the second rear wall section, the material cutout being penetrated by the positioning means,
wherein the front wall is mounted, with the second front wall section, on a front cross strut of the cross struts, and the rear wall is mounted, with the second rear wall section, on the rear cross strut of the cross struts,
wherein in the transport position of the bag body
  the article is accommodated between the front wall and the rear wall,
and wherein in the loading and/or unloading position of the bag body
  the loading and/or unloading opening is delimited by the front wall and the rear wall and adjoins the first end edge of the base plate, and
  the first rear wall section forms a guide wall, which protrudes beyond the base plate, between the first side edge and the second side edge, wherein the guide wall forms a guide wall surface, which tapers in the direction of the loading and/or unloading opening and is oriented vertically.

16. The article container according to claim 15, wherein a transport rest is formed continuously between the first side edge and the second side edge.

17. An unloading station for automatic unloading of an article container loaded with at least one article,
  the article container comprising
    a bag body that is adjustable between a transport position and an unloading position,
    a suspended support for suspended transport of the article container on an overhead conveying device, and
    a frame, by means of which the bag body is suspended on the suspended support and by means of which the bag body can be adjusted between the transport position and the unloading position,
wherein the bag body comprises
a front wall and a rear wall made from a flexible material,
a first side edge and a second side edge along the front wall and the rear wall,
an unloading opening formed on a first side of the bag body at least in some regions between the front wall and the rear wall, and
a side wall stop formed on a second side of the bag body at least in some regions between the front wall and the rear wall, and the article is placeable against the side wall stop,
wherein the front wall
comprises a first front wall section and a second front wall section, and
is provided with a base plate in the first front wall section, the base plate comprising
a first longitudinal edge,
a second longitudinal edge extending at a distance from the first longitudinal edge,
a first end edge extending between the first longitudinal edge and the second longitudinal edge, and
a second end edge extending between the first longitudinal edge and the second longitudinal edge,
wherein the base plate adjoins the first side edge with the first end edge and adjoins the second side edge with the second end edge,
wherein the rear wall forms
comprises a first rear wall section and a second rear wall section,
adjoins the first front wall section with the first rear wall section, and
has a lower rigidity in the first rear wall section than in the first front wall section,
wherein in the transport position of the bag body
the article is accommodated between the front wall and the rear wall, and
the first rear wall section forms a transport rest between the first side edge and the second side edge, the transport rest forming a transport rest surface sloping in the direction of the side wall stop,
wherein in the unloading position of the bag body
the unloading opening is delimited by the front wall and the rear wall and adjoins the first end edge of the base plate,
wherein the unloading station comprises
an overhead conveying device for transporting the article container to the unloading station and transporting the article container away from the unloading station,
an opening and closing device comprising a first actuation device configured to pivot the frame pivoted about an axis relative to the suspended support such that the bag body can be adjusted between the transport position and the unloading position, and
an unloading device comprising a second actuation device configured to tilt the article container along with the bag body about a tilting axis extending in parallel to the longitudinal extension of the overhead conveying device between a provisioning position and an unloading position, wherein in the unloading position, the article can be discharged from the article container through the unloading opening.

18. The unloading station according to claim 17, wherein the first actuation device comprises a driver mechanism having an inlet section aligned upstream in a transport direction of the article container,
an outlet section aligned downstream in the transport direction of the article container, and
an unloading section arranged between the inlet section and the outlet section,
wherein the inlet section forms a tilted guide track that can be brought into an abutting contact with the frame such that the frame is pivoted during the transport of the article container to the unloading station, whereby the bag body is adjusted from the transport position into the loading and/or unloading position.

19. The unloading station according to claim 18, wherein the unloading section forms a horizontal guide track that can be brought into an abutting contact with the frame such that the frame is held in the pivoted deflection position during the unloading operation, whereby the bag body also remains in the opened position.

20. The unloading station according to claim 18, wherein the outlet section forms a tilted guide track that can be brought into an abutting contact with the frame such that the frame is pivoted during the transport of the article container out of away from the unloading station, whereby the bag body is adjusted from the unloading position into the transport position.

21. The unloading station according to claim 17, wherein the overhead conveying device further comprises transport carriers movable using a drive device, wherein a transport carrier and the suspended support are coupled to one another in an articulated manner, whereby the suspended support is pivotable about an axis extending in parallel to the overhead conveying device relative to the transport carrier.

22. The unloading station according to claim 17, wherein the second actuation device of the unloading device comprises a frame structure that can be tilted by a drive between an initial position and an actuation position about an axis extending in parallel to the transport direction of the article container, and the first actuation device of the opening and closing device is mounted on the frame structure.

23. An unloading station for automatic unloading of an article container loaded with at least one article,
the article container comprising
a bag body that is adjustable between a transport position and an unloading state position,
a suspended support for suspended transport of the article container on an overhead conveying device, and
a frame, by means of which the bag body is suspended on the suspended support and by means of which the bag body can be adjusted between the transport position and the unloading position,
wherein the bag body comprises
a front wall and a rear wall made from a flexible material,
a first side edge and a second side edge along the front wall and the rear wall,
an unloading opening formed on a first side of the bag body at least in some regions between the front wall and the rear wall, and
a side wall stop formed on a second side of the bag body at least in some regions between the front wall and the rear wall, and the article is placeable against the side wall stop,
wherein the front wall
comprises a first front wall section and a second front wall section, and is provided with a base plate in the first front wall section, the base plate comprises
   a first longitudinal edge,
   a second longitudinal edge extending at a distance from the first longitudinal edge,
   a first end edge extending between the first longitudinal edge and the second longitudinal edge, and
   a second end edge extending between the first longitudinal edge and the second longitudinal edge,
     wherein the base plate adjoins the first side edge with the first end edge and adjoins the second side edge with the second end edge,
wherein the rear wall
   comprises a first rear wall section and a second rear wall section,
   adjoins the first front wall section with the first rear wall section, and
   has a lower rigidity in the first rear wall section than in the first front wall section,
wherein in the transport position of the bag body
   the article is accommodated between the front wall and the rear wall,
wherein in the unloading position of the bag body
   the unloading opening is delimited by the front wall and the rear wall and adjoins the first end edge of the base plate, and
   the first rear wall section comprises a guide wall, which protrudes beyond the base plate, between the first side edge and the second side edge, wherein the guide wall forms a guide wall surface, which tapers in the direction of the unloading opening and is oriented vertically,
wherein the unloading station comprises
   the overhead conveying device for transporting the article container to the unloading station and transporting the article container away from the unloading station,
   an opening and closing device comprising a first actuation device configured to pivot the frame about an axis relative to the suspended support such that the bag body can be adjusted between the transport position and the unloading state position, and
   an unloading device comprising a second actuation device configured to tilt the article container along with the bag body about a tilting axis extending in parallel to the longitudinal extension of the overhead conveying device between a provisioning position and an unloading position, wherein in the unloading position, the article can be discharged from the article container through the unloading opening.

24. The unloading station according to claim 23, wherein the first actuation device comprises a driver mechanism having
   an inlet section aligned upstream in a transport direction of the article container,
   an outlet section aligned downstream in the transport direction of the article container, and
   an unloading section arranged between the inlet section and the outlet section,
   wherein the inlet section forms a tilted guide track that can be brought into an abutting contact with the frame such that the frame is pivoted during the transport of the article container to the unloading station, whereby the bag body is adjusted from the transport position into the loading and/or unloading position.

25. The unloading station according to claim 24, wherein the unloading section forms a horizontal guide track that can be brought into an abutting contact with the frame such that the frame is held in the pivoted deflection position during the unloading operation, whereby the bag body also remains in the opened position.

26. The unloading station according to claim 24, wherein the outlet section forms a tilted guide track that can be brought into an abutting contact with the frame such that the frame is pivoted during the transport of the article container away from the unloading station, whereby the bag body is adjusted from the unloading position into the transport position.

27. The unloading station according to claim 23, wherein the overhead conveying device further comprises transport carriers movable by a drive device, wherein a transport carrier and the suspended support are coupled to one another in an articulated manner, whereby the suspended support is pivotable about an axis extending in parallel to the overhead conveying device relative to the transport carrier.

28. The unloading station according to claim 23, wherein the second actuation device of the unloading device comprises a frame structure that can be tilted using a drive between an initial position and an actuation position about an axis extending in parallel to the transport direction of the article container, and the first actuation device of the opening and closing device is mounted on the frame structure.

* * * * *